United States Patent

Sato et al.

[11] Patent Number: 5,926,616
[45] Date of Patent: Jul. 20, 1999

[54] PRINTING APPARATUS AND METHOD

[75] Inventors: Nobuyuki Sato; Hiroshi Ueno; Kei Koitabashi, all of Tokyo, Japan

[73] Assignee: Oki Data Corporation, Tokyo, Japan

[21] Appl. No.: 08/909,557

[22] Filed: Aug. 12, 1997

[30] Foreign Application Priority Data

Aug. 28, 1996 [JP] Japan ................................ 8-245547

[51] Int. Cl.$^6$ .................................................. G06K 15/00
[52] U.S. Cl. ........................................... 395/102; 395/101
[58] Field of Search .................................. 395/101, 102, 395/109, 112, 115, 116, 106; 382/252, 298, 264, 299, 300; 358/451, 449; 345/439, 472, 127, 129, 130, 132, 136, 523

[56] References Cited

U.S. PATENT DOCUMENTS 5,208,871  5/1993  Eschbach ................................ 382/41
5,465,166  11/1995  Kamo ................................ 358/451

FOREIGN PATENT DOCUMENTS 6-71940  3/1994  Japan .

Primary Examiner—Arthur G. Evans
Attorney, Agent, or Firm—Panitch Schwarze Jacobs & Nadel, P.C.

[57] ABSTRACT

The horizontal resolution of an input dot image is multiplied by an odd integer m, greater than unity, to produce an intermediate image. The intermediate image is smoothed by logic operations to form a final image, which is printed at a horizontal resolution equal to the horizontal resolution of the intermediate image divided by two. The horizontal resolution of the input dot image is therefore multiplied by a half-integer value (m/2) in the final image. The vertical resolution of the final image is twice the vertical resolution of the intermediate image, but may be adjusted by reducing the space between raster lines if necessary, so that the image can be printed on one page.

24 Claims, 30 Drawing Sheets

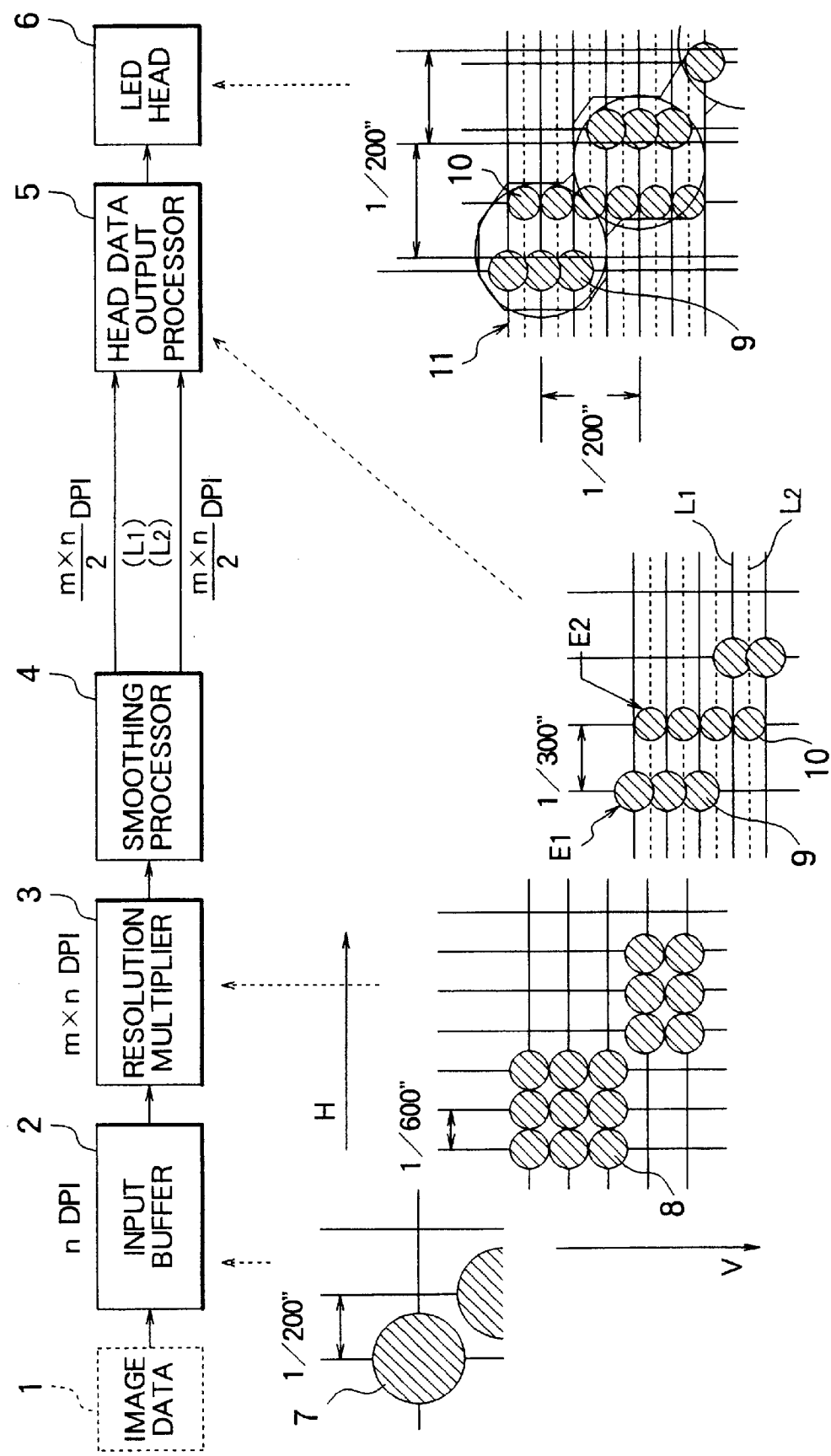

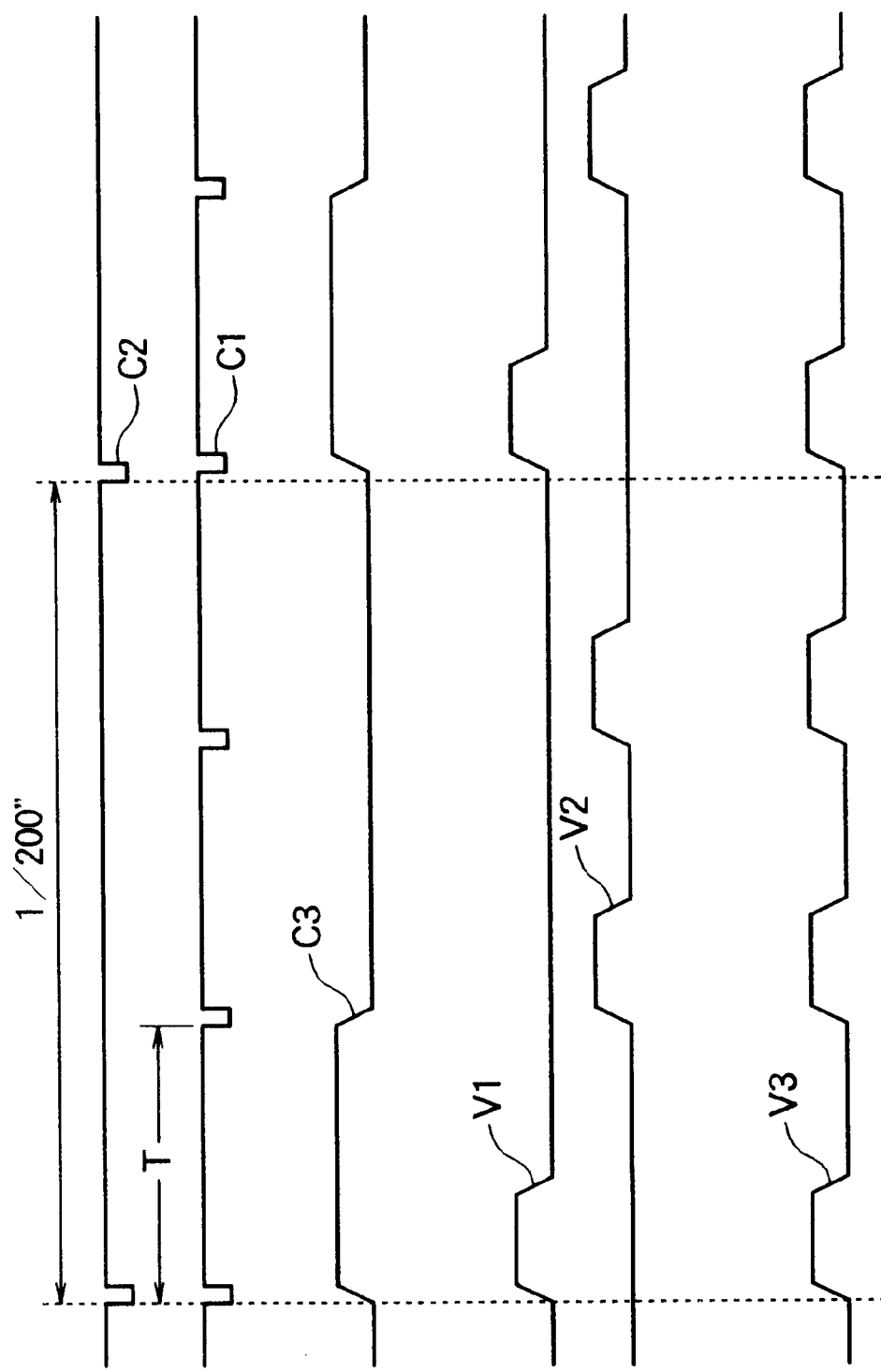

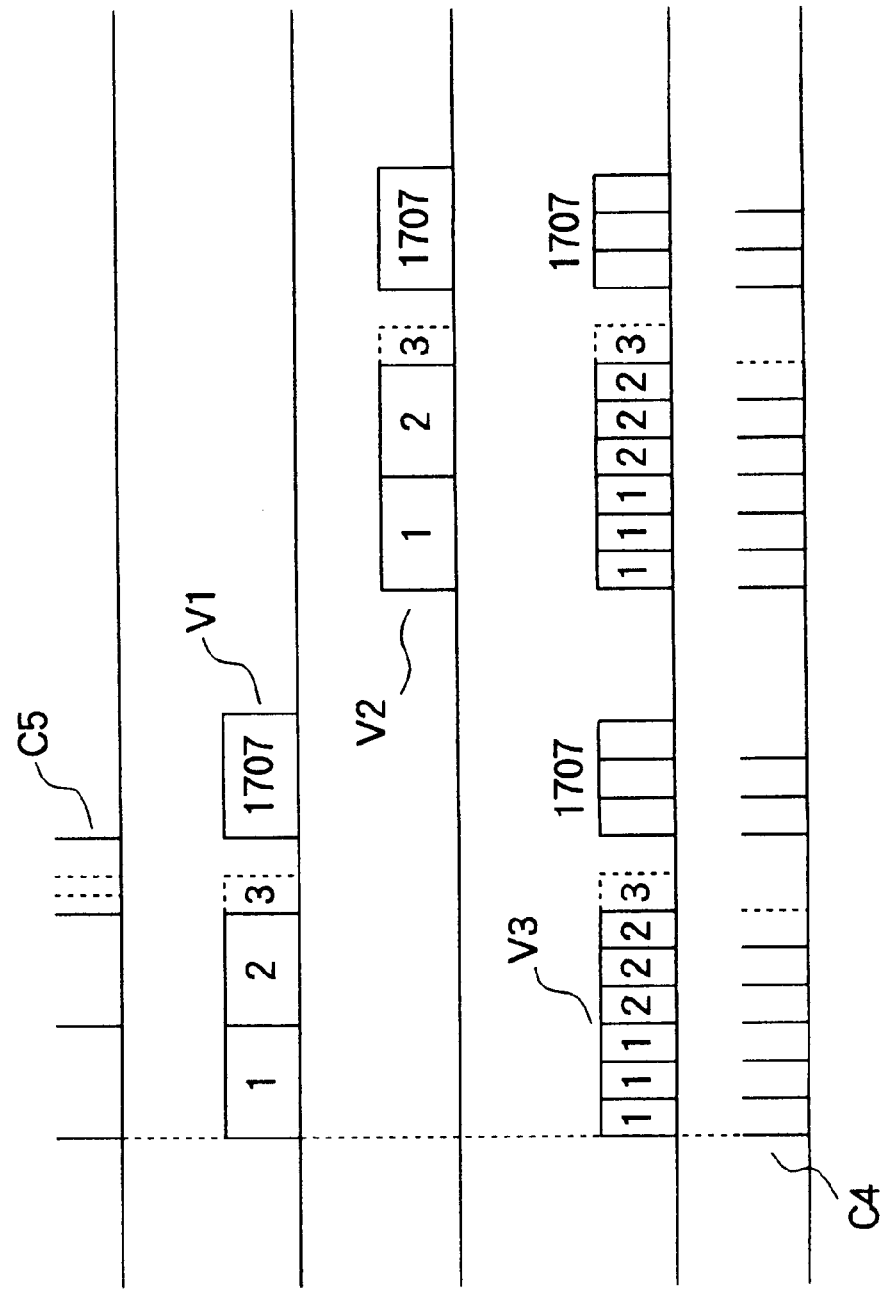

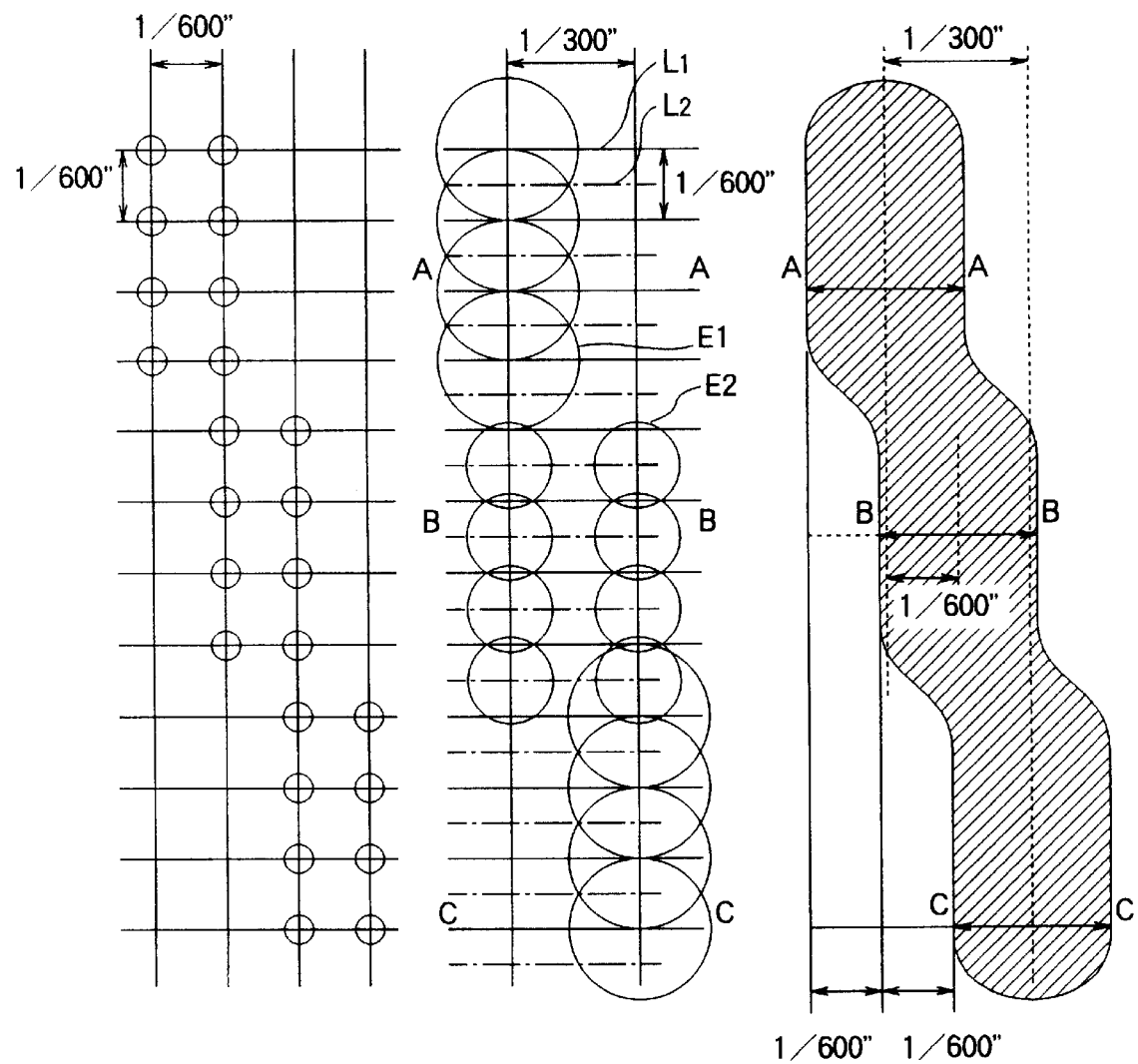

PRINTING APPARATUS AND METHOD

BACKGROUND OF THE INVENTION

The present invention relates to a printing apparatus and method suitable for printing a digitized image at an altered resolution without loss of image quality.

Improvements in image-processing technology have enabled facsimile machines, personal computers, workstations, and similar devices to exchange and process a wide variety of images. For example, an image received by a facsimile machine or television receiver may be captured into the memory of a personal computer, processed in the computer, then printed on a printer connected to the computer.

A problem that arises is that different devices generate digitized images at different resolutions, and printers also have different resolutions. Thus a personal computer may receive an image having a resolution of six hundred dots per inch (600 DPI), and have to print the image on an electrophotographic printer with a resolution of 300 DPI. The simple solution of converting the resolution by skipping alternate dots and lines leads to serious image degradation.

Japanese Patent Kokai Publication No. 71940/1994 discloses a printer that solves this problem by doubling the vertical resolution while halving the horizontal resolution. Each raster line in the original 600-DPI image yields two 300-DPI printed lines, with dots combined by AND logic in one line and exclusive-OR logic in the other line. This solution works well when the resolution ratio is 2:1, but does not apply to other resolution ratios.

Non-integer resolution ratios are particularly troublesome. When a personal computer's facsimile application software receives image data having a resolution of 200 DPI, for example, and prints the image on a 300-DPI printer, the resolution must be increased by a factor of 1.5. Conventionally, this is done by repeating every second dot and every second line, but that leads to uneven printing of fine detail, such as the fine lines that form characters in text. Moreover, if the image contains bit-mapped data generated from a natural image by dithering, the repeating of every second line and dot can generate moire patterns that greatly impair the appearance of the image.

Another known technique accordingly divides an image into a text part and a non-text part, converts the resolution of the text part by a mapping method that takes line thicknesses into account, and converts the resolution of the non-text part by a method such as error diffusion that avoids moire patterns. Text and non-text parts must be accurately identified, however, because if the wrong method is applied, the appearance is the printed output is considerably worsened. Complex and expensive processing circuits are required to recognize text and non-text parts of images with reasonable accuracy, and even these circuits become unreliable when text is superimposed on a natural image.

The problems described above occur not only with electrophotographic printers, but also with thermal printers and ink-jet printers which, like electrophotographic printers, form images from dots.

SUMMARY OF THE INVENTION

A general object of the present invention is to print a dot image having a first horizontal resolution at a second horizontal resolution equal to a half-integer multiple of the first horizontal resolution, without loss of image quality.

Another object is to enable a facsimile image received by a computer to be printed without loss of image quality.

Yet another object is object is to enable a super-fine facsimile image received by a computer to be printed without loss of image quality.

Still another object is to print a dot image at a horizontal resolution multiplied by a half-integer factor, both without loss of image quality and without the generation of excessive electromagnetic interference.

A further object is to print dot images having a variety of horizontal resolutions.

A still further object is to print an image on one page, even if the image length exceeds the page length.

The invented printing method multiplies the horizontal resolution of an input dot image by an odd integer m, greater than unity, to produce an intermediate image. The vertical resolution of the intermediate image is equal to or greater than the vertical resolution of the input dot image. For example, the vertical resolution may also be multiplied by m.

The intermediate image is then smoothed to form a final image, which is printed with a horizontal resolution equal to the horizontal resolution of the intermediate image divided by two. The vertical resolution of the final image is twice the vertical resolution of the intermediate image. If necessary, the vertical resolution can be adjusted according to the length of the input dot image.

The final image is preferably printed on basic raster lines, in which dots are generated by logical AND operations, and additional raster lines, in which dots are generated by logical exclusive OR operations, using a greater printing energy on the basic raster lines than on the additional raster lines. The printing energies are preferably adjusted so that the width of the individual dots on the basic raster lines exceeds the width of the dots on the additional raster lines by an amount equal to the spacing between adjacent dots.

The invented printing apparatus has a resolution multiplier that creates the intermediate image, a smoothing processor that creates the final image, and a printing head that prints the final image.

The smoothing processor preferably has a line timing generator that generates a line timing signal at a selectable or programmable frequency. The smoothing processor may also have a line counter for counting raster lines in the input dot image, and a processor for changing the frequency of the line timing signal when the line count exceeds the number of lines normally printed on one page.

The resolution multiplier may have a programmable frequency divider that divides the frequency of the line timing signal by a selectable factor, the factor of unity being included in the selection. The resolution multiplier may also have a selector that can bypass the multiplying of the horizontal resolution by m.

When the multiplying of the horizontal resolution is not bypassed, the final image is printed at a horizontal resolution equal to a half-integer multiple of the horizontal resolution of the input dot image, the half-integer being equal to m/2.

If m is equal to three, a facsimile image having horizontal and vertical resolutions of substantially 200 DPI can be printed at a horizontal resolution of 300 DPI. A super-fine facsimile image having a vertical resolution of substantially 400 DPI can be printed by increasing the frequency of line timing signal.

If the vertical resolution of the intermediate image is equal to the vertical resolution of the input dot image, the final image can be printed without generating excessive electromagnetic interference.

The selector in the resolution multiplier can be used to print input dot images having different horizontal resolutions.

An input dot image have a length exceeding the length of one page can be printed on one page by adjusting the frequency of the line timing signal so that the image is compressed vertically.

BRIEF DESCRIPTION OF THE DRAWINGS

In the attached drawings:

FIG. 1 schematically illustrates the general configuration and operation of a first embodiment of the invention;

FIG. 6 is a timing diagram illustrating the operation of the resolution multiplier in FIG. 1;

FIG. 7 is a more detailed timing diagram illustrating the operation of the resolution multiplier in FIG. 1;

FIGS. 13A, 13B, and 13C illustrate the general operation of the smoothing processor in FIG. 1 in the printing of a nearly vertical line two dots thick;

DETAILED DESCRIPTION OF THE INVENTION

Figure 2A:
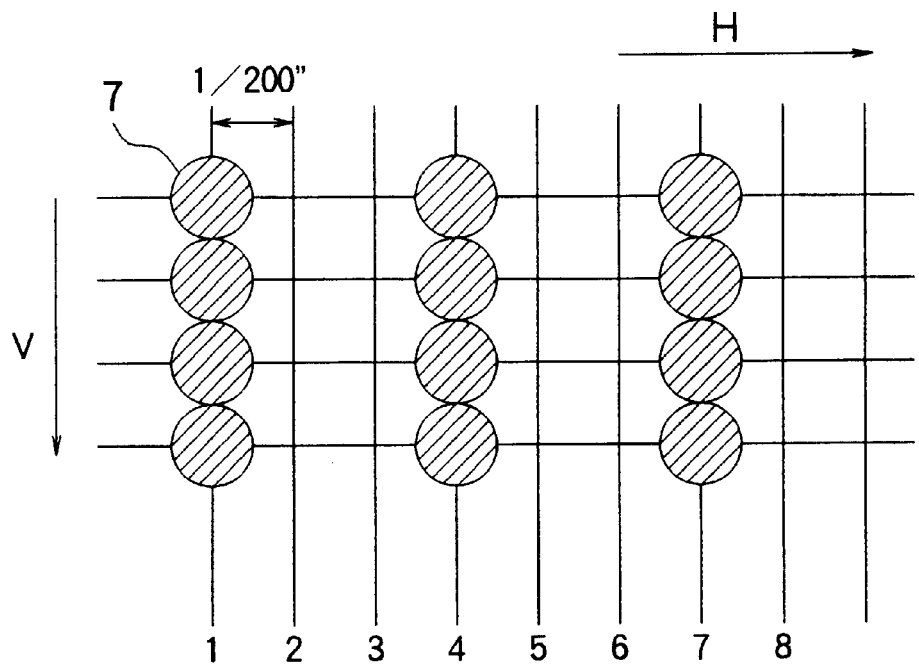
FIGS. 2A, 2B, 3A, 3B, 3C, 3D, 4A, 4B, 4C, and 4D illustrate problems that occur when resolution is converted by a factor of 1.5 by the conventional method.

Embodiments of the invention will be described below with reference to the attached illustrative drawings.

Referring to FIG. 1, the first embodiment is an electrophotographic printer that receives image data 1 representing a dot image having a resolution of n DPI, where n is a positive number. The printer has an input buffer 2 for receiving the image data 1, a resolution multiplier 3 for multiplying the resolution by an odd integer m, a smoothing processor 4 for smoothing the resulting intermediate image, a head data output processor 5, a light-emitting-diode (LED) printing head 6, and other well-known elements which are not illustrated.

The input image data 1 stored in the input buffer 2 are, for example, bit-mapped facsimile data having a horizontal resolution of eight dots per millimeter in each raster line, and a vertical resolution of 7.7 raster lines per millimeter or 7.7 dots per millimeter. The exact resolution is accordingly 203.2 DPI in the horizontal scanning direction H, and 195.6 DPI in the vertical scanning direction V, but these values can both be treated as 200 DPI with negligible image distortion. Accordingly, in the following description n will be equal to two hundred, and the input image will be considered to consist of dots 7 with a horizontal and vertical spacing of one two-hundredth of an inch (1/200"). The LED printing head 6 has a horizontal resolution of 300 DPI, producing dots with a horizontal spacing of 1/300".

The basic operation of the first embodiment is summarized in FIG. 1. The resolution multiplier 3 triples the resolution of the input image (thus m=3), converting each input dot 7 to nine dots 8 with a horizontal and vertical spacing of 1/600", i.e. a resolution of 600 DPI. The smoothing processor 4 alters the horizontal spacing to 1/300", thereby halving the horizontal resolution (to 300 DPI), but doubles the vertical resolution by producing both basic raster lines ($L_1$), which are mutually separated by 1/600", and additional raster lines ($L_2$), which are disposed between the basic raster line. Pairs of adjacent dots are combined by AND logic in the basic raster lines, and by exclusive-OR logic in the additional raster lines.

The head data output processor 5 controls the LED printing head 6 so that dots in the basic raster lines (basic dots 9) are printed with a certain energy E1, and dots in the additional raster lines (additional dots 10) are printed with a smaller energy E2. Each dot 7 in the input image is printed as an equivalent dot 11 comprising three basic dots 9 and three additional dots 10. The 300-DPI LED printing head 6 thereby prints a 200-DPI input image with substantially no image degradation.

Incidentally, the LED printing head 6 actually forms a latent image on a photosensitive drum (not visible), and the latent image is then printed by being developed and transferred to paper. For simplicity, however, the LED printing head 6 will be said to print the image, the development and transfer processes being understood to take place. The description of the first embodiment given below thus carries over directly to thermal and ink-jet printing heads, which print directly on paper.

As a basis for comparison, the conventional method of converting from 200 DPI to 300 DPI will be described next.

Figure 2B:
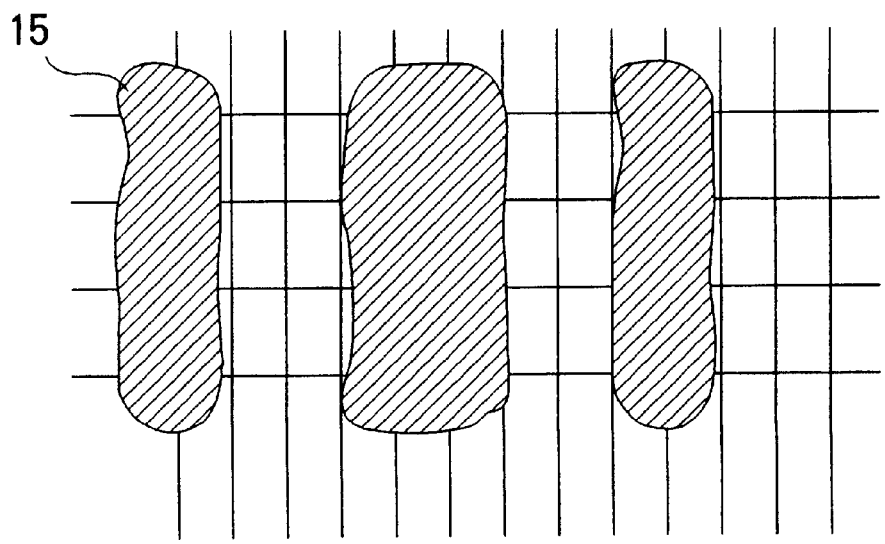

FIG. 2A shows part of a 200-DPI image comprising three fine vertical lines spaced at intervals of 3/200", each line having a width of one dot 7. The numbers at the bottom of FIG. 2A identify dot positions in each horizontal raster line. The conventional method of converting this image to 300 DPI doubles all even-numbered dots, giving the printed result shown in FIG. 2B. The vertical lines in positions one and seven in FIG. 2A are printed with a width of one dot 15 in FIG. 2B, but the vertical line in position four is printed with a width of two dots in FIG. 2B, destroying the uniformity of the lines.

Figure 3A:
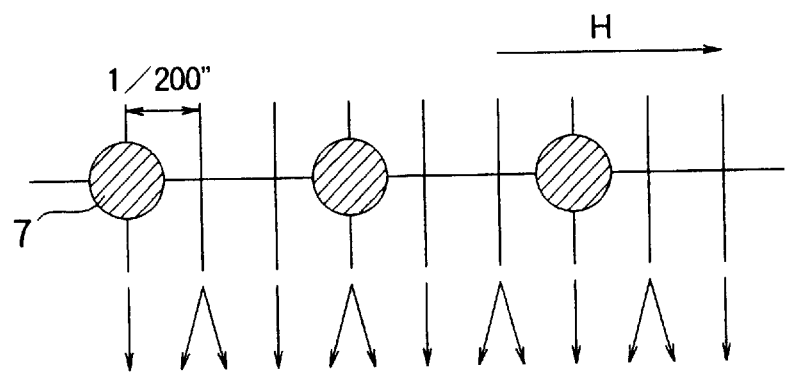
Figure 3B:
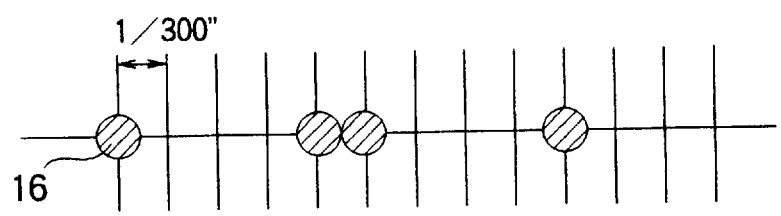
Figure 3C:
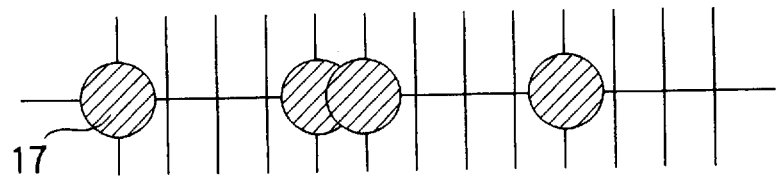
Figure 3D:
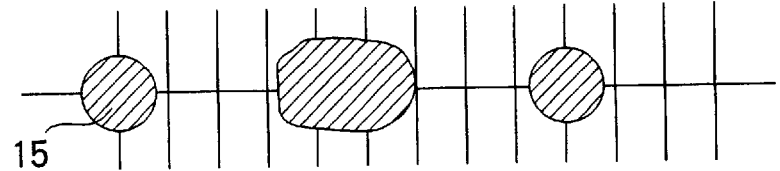

To explain this conversion process in more detail, FIG. 3A shows one raster line of the 200-DPI image. The arrows at the bottom of FIG. 3A indicate the mapping of 200-DPI dot positions onto 300-DPI dot positions. FIG. 3B indicates the positions of dots 16 in the converted 300-DPI raster line. A conventional 300-DPI LED printer uses the same energy to print all dots, the energy being sufficient to cause adjacent dots to overlap. FIG. 3C illustrates the overlapping dots 17 formed in the latent image by the LED printing head. The size of the dots 17 in FIG. 3C corresponds to the energy supplied to the LED printing head. FIG. 3D illustrates the printed result, showing that even-numbered dots in the original image become wider than odd-numbered dots.

Figure 4A:
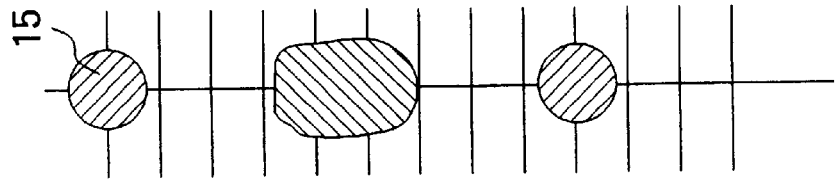
Figure 4B:
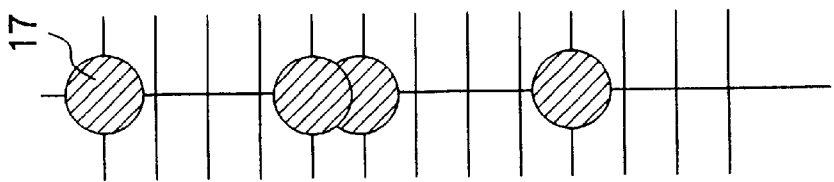
Figure 4C:
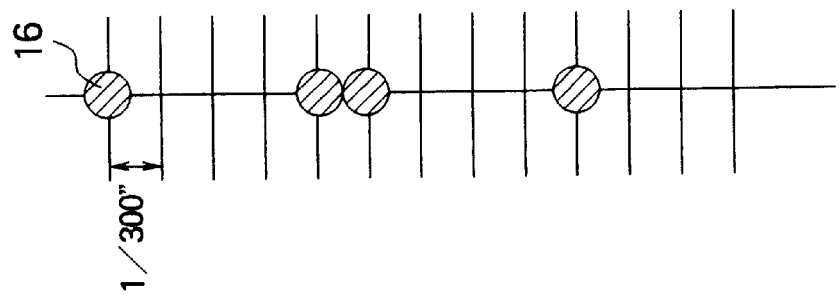
Figure 4D:
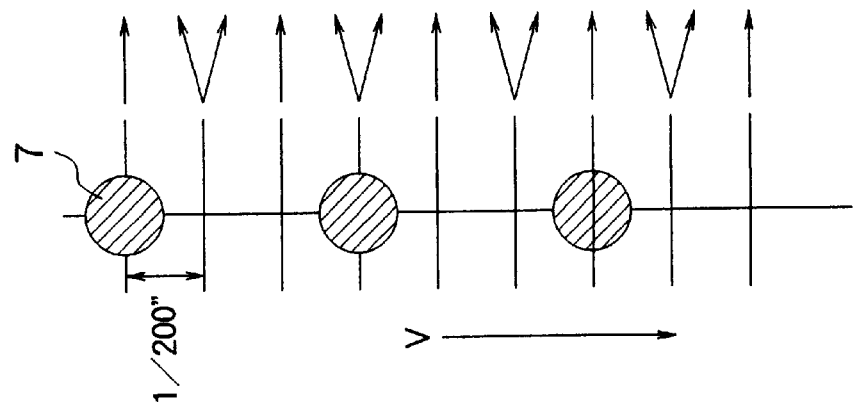

FIGS. 4A, 4B, 4C, and 4D illustrate the same problem in the vertical scanning direction V. When the 200-DPI image in FIG. 4A is converted to 300 DPI as in FIG. 4B, even-numbered raster lines are doubled while odd-numbered raster lines are not. All raster lines are printed with the same energy, as indicated by the size of the dots 17 in FIG. 4C, leading to the uneven printed result shown in FIG. 4D.

FIG. 1 has briefly shown how this problem is solved in the first embodiment; now a more detailed description will be given. First, the internal structure and operation of the resolution multiplier 3 will be described.

Figure 5:
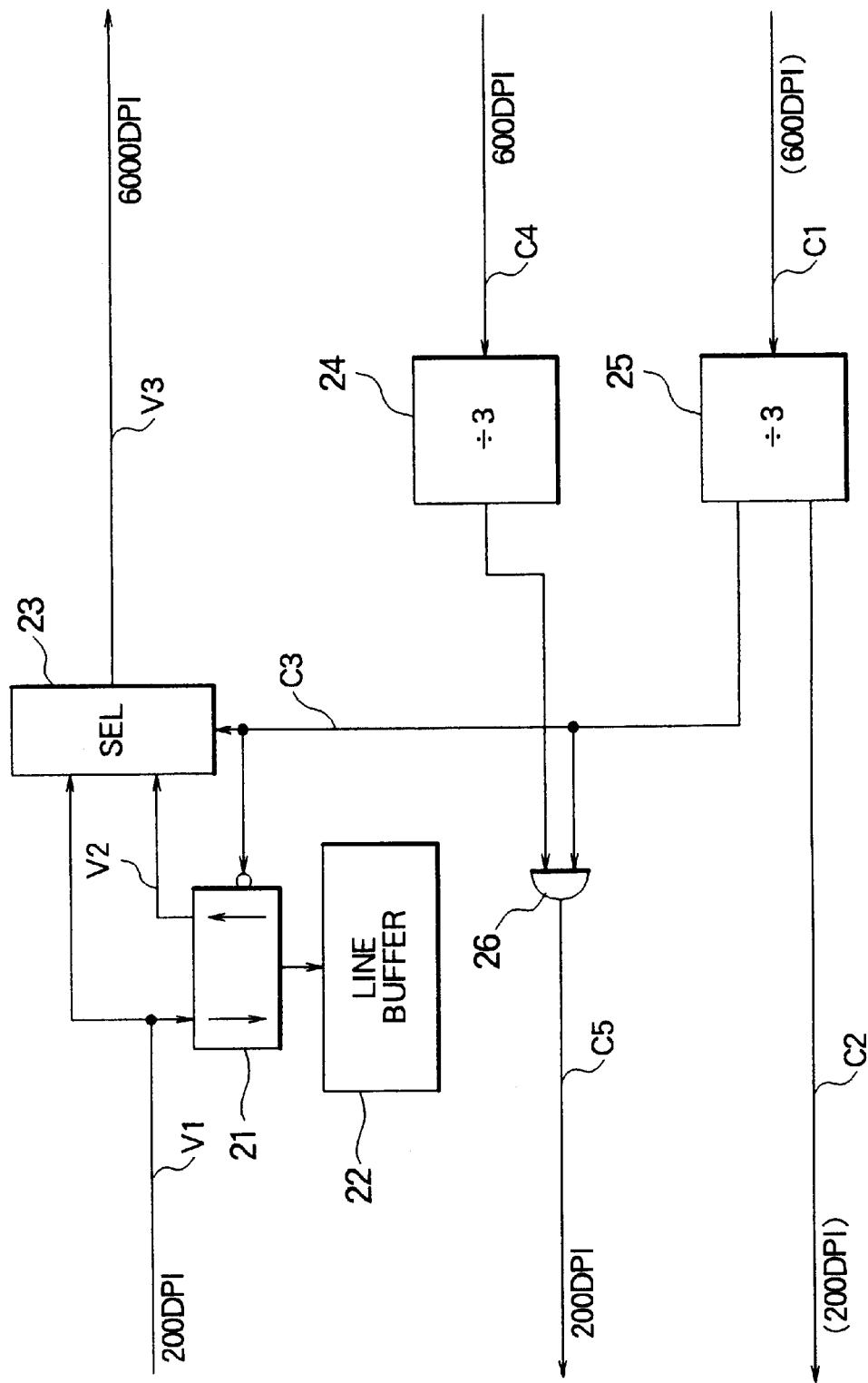
FIG. 5 schematically illustrates the structure of the resolution multiplier in FIG. 1.

Referring to FIG. 5, the resolution multiplier 3 comprises a selector 21, a line buffer 22, another selector 23, a pair of frequency dividers 24 and 25, and an AND gate 26. Frequency divider 25 divides the frequency of a 600-DPI master line timing signal C1 by three to create a line input timing signal C2, and also generates a line selection signal C3, which is supplied to the AND gate 26 and selectors 21 and 23. Frequency divider 24 divides the frequency of a 600-DPI dot transfer clock signal C4 by three and supplies the divided signal to the AND gate 26. The output of the AND gate 26 is a 200-DPI dot input clock signal C5.

Selectors 21 and 23 receive a 200-DPI bit-mapped input image signal V1, which is output by a host device in synchronization with the line input timing signal C2 and dot input clock signal C5. The host device is, for example, a higher-order control section of the printer, or a personal computer to which the printer is connected. At a timing that will be described later, selector 21 passes the bit-mapped input image signal V1 to the line buffer 22, where the bit-mapped input image signal V1 is temporarily stored. At another timing that will be described later, selector 21 passes the stored signal from the line buffer 22 to selector 23 as a repeated image signal V2. Selector 23 selects either the bit-mapped input image signal V1 or the repeated image signal V2, and outputs the selected signal as a 600-DPI intermediate image signal V3.

The operation of the first embodiment in receiving print data is illustrated in the timing diagram in FIG. 6. The line input timing signal C2 is a pulse signal that instructs the host device to send a new raster line. Each C2 pulse corresponds to 1/200" in the vertical direction in the image.

The master line timing signal C1 from which the line input timing signal C2 is generated has a period T corresponding to 1/600" in the vertical direction in the image, equal to one-third the period of the line input timing signal C2. The line selection signal C3 goes high at each C2 pulse, then goes low at the next C1 pulse. Selector 21 stores the bit-mapped input image signal V1 in the line buffer 22 while the line selection signal C3 is high, and reads the stored data as the repeated image signal V2 while the line selection signal C3 is low. Selector 23 selects the bit-mapped input image signal V1 while the line selection signal C3 is high, and selects the repeated image signal V2 read from the line buffer 22 while the line selection signal C3 is low.

During the first part of the period T while the line selection signal C3 is high, the bit-mapped input image signal V1 for one raster line is received and stored in the line buffer 22, and is also selected by selector 23 as the intermediate image signal V3. During the next two periods of duration T, while the line selection signal C3 is low, the same data are furnished from the line buffer 22 to selector 23 as the repeated image signal V2, and are selected for output as the intermediate image signal V3. Thus during one period of the line input timing signal C2, selector 23 outputs the same data three times in the intermediate image signal V3.

FIG. 7 shows further details of this operation. For each raster line, the 200-DPI bit-mapped input image signal V1 comprises, for example, one thousand seven hundred seven (1707) bits, which are received in synchronization with the dot input clock signal C5. During the interval while these bits are being received, the intermediate image signal V3 output by selector 23 comprises the same bit values, but these bit values are output in synchronization with the dot transfer clock signal C4. Each bit is output three times in succession, because the frequency of the dot transfer clock signal C4 is three times as high as the frequency of the dot input clock signal C5.

After the entire raster line has been received and output by selector 23 in this way, the same line is read two more times as the repeated image signal V2 from the line buffer 22, and output again in the intermediate image signal V3. FIG. 7 shows the first of these two repetitions.

Figure 8A:
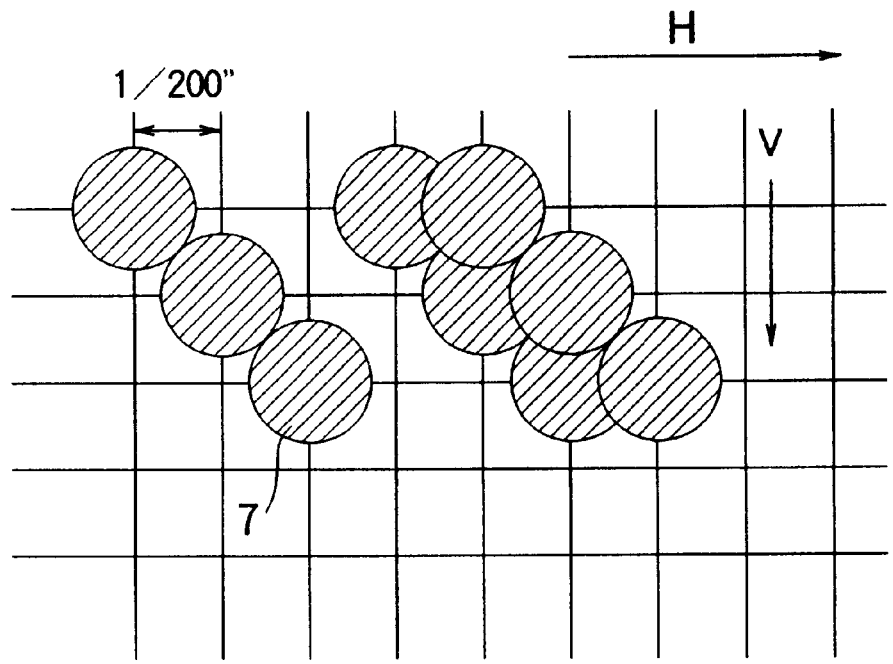
FIGS. 8A and 8B illustrate the tripling of horizontal and vertical resolution by the resolution multiplier in FIG. 1.
Figure 8B:
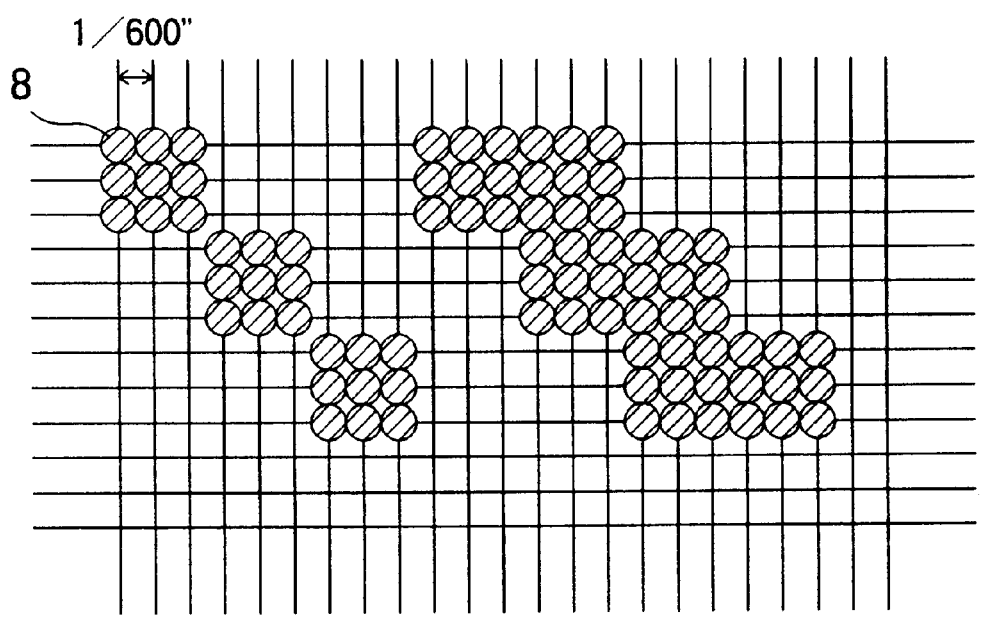

The image resolution is accordingly tripled in both the horizontal and vertical directions. FIG. 8A shows part of a 200-DPI input image, the dots 7 representing bits set to 'one' in the bit-mapped input image signal V1. FIG. 8B shows the corresponding part of the 600-DPI intermediate image output by the resolution multiplier 3. Each input dot 7 in FIG. 8A becomes a three-by-three square of nine dots 8 in FIG. 8B. The dots in FIG. 8B are shown smaller in the drawing to indicate the increased resolution. The intermediate image in FIG. 8B is output to the smoothing processor 4.

Figure 9:
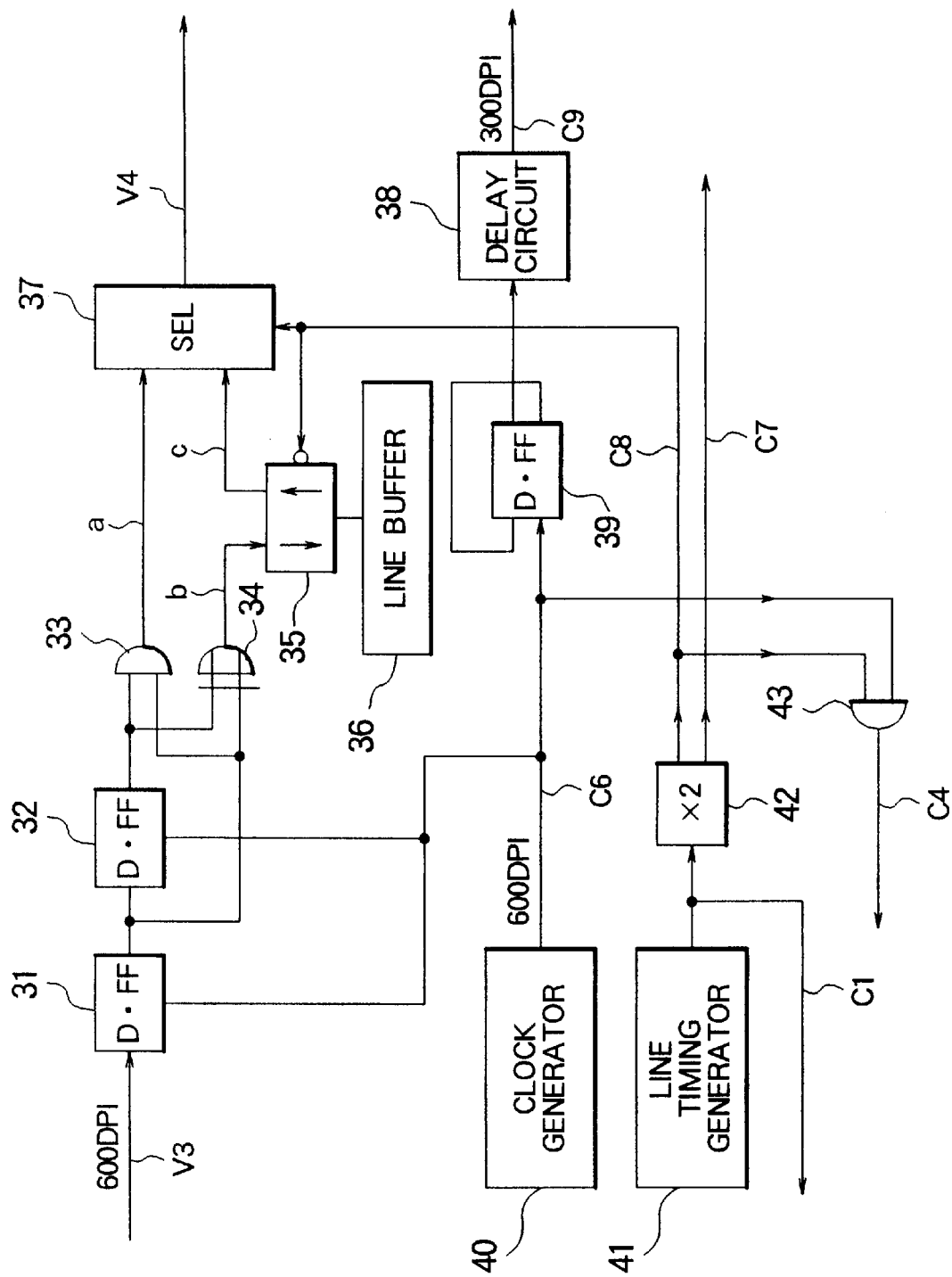
FIG. 9 schematically illustrates the structure of the smoothing processor in FIG. 1.

FIG. 9 shows the internal structure of the smoothing processor 4, which comprises a pair of D-type flip-flops 31 and 32, an AND gate 33, an exclusive-OR gate 34, a selector 35, a line buffer 36, another selector 37, a delay circuit 38, another D-type flip-flop 39, a clock generator 40, a line timing generator 41, a frequency multiplier 42, and another AND gate 43.

The intermediate image signal V3 is received from the resolution multiplier 3 by D-type flip-flops 31 and 32, which are coupled in series. The outputs of both D-type flip-flops 31 and 32 are supplied to AND gate 33, and also to exclusive-OR gate 34. The output (a) of AND gate 33 is supplied to selector 37. The output (b) of exclusive-OR gate 34 is supplied through selector 35 to the line buffer 36, then (c) from the line buffer 36 through selector 35 to selector 37. The output of selector 37 is a final image signal V4, which is sent to the head data output processor 5 in FIG. 1.

The D-type flip-flops 31 and 32 are clocked by a master dot clock signal C6 generated by the clock generator 40. D-type flip-flop 39 is configured as a toggle flip-flop that divides the frequency of the master dot clock signal C6 by two. The divided signal is delayed in the delay circuit 38 to create a dot output clock signal C9, which is supplied to the head data output processor 5 in FIG. 1.

The line timing generator 41 generates the master line timing signal C1 that is input to the resolution multiplier 3 as shown in FIG. 5. The frequency multiplier 42 multiplies the frequency of the master line timing signal C1 by two to create a latch signal C7, which is supplied to the head data output processor 5. The frequency multiplier 42 also outputs a dot selection signal C8 which controls the selectors 35 and 37. AND gate 43 takes the logical AND of the master dot clock signal C6 and dot selection signal C8 to create the dot transfer clock signal C4 that is sent to the resolution multiplier 3 in FIG. 5.

Next, the operation of the smoothing processor 4 will be described.

Figure 10:
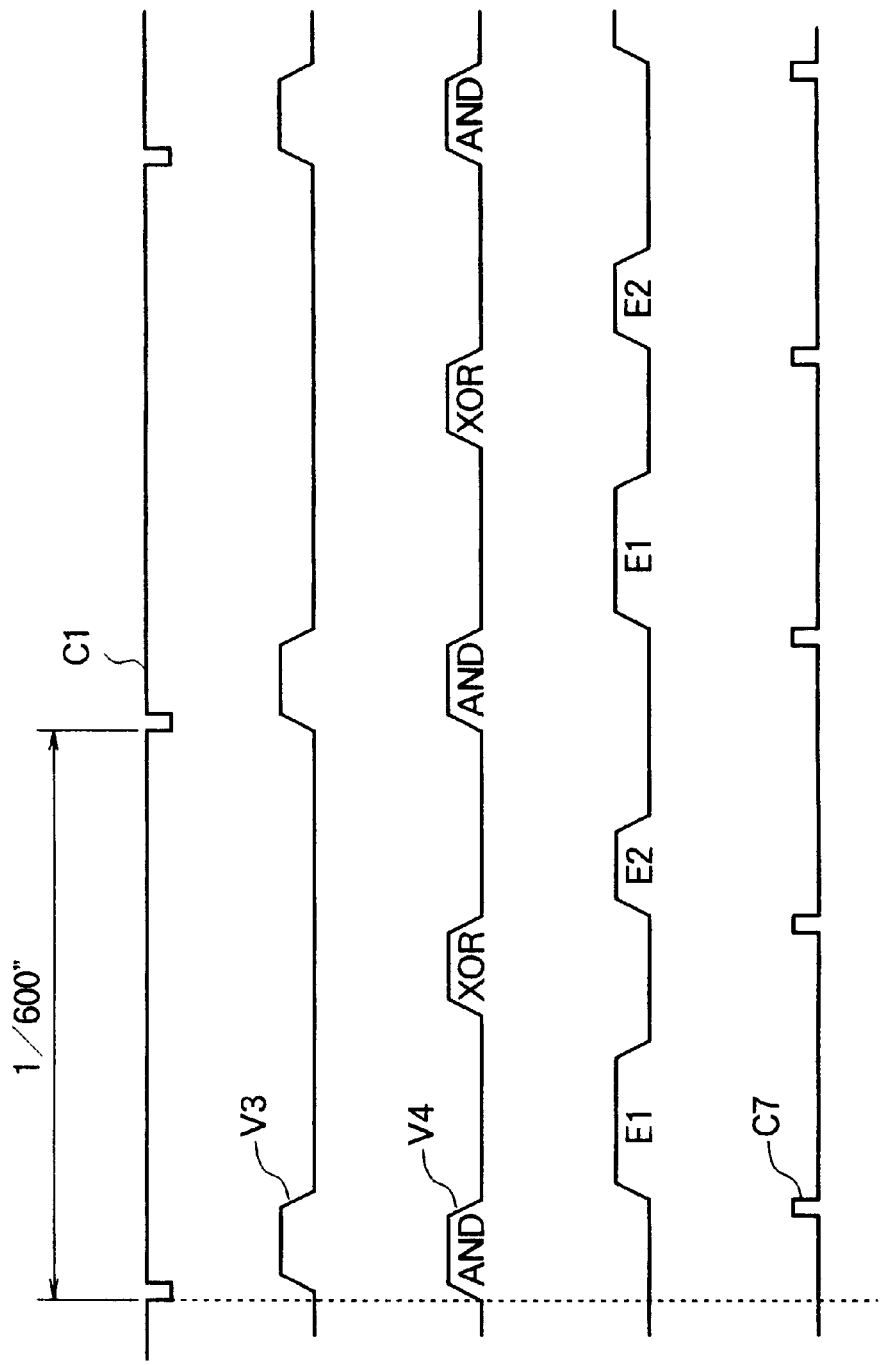
FIG. 10 is a timing diagram illustrating the operation of the smoothing processor in FIG. 1.

FIG. 10 shows the basic timing during the input of two raster lines from the resolution multiplier 3. The input of each raster line is triggered by a pulse of the master line timing signal C1. These pulses are generated at intervals corresponding to 1/600" in the vertical scanning direction. The data for each raster line are received in the intermediate image signal V3 immediately following the triggering pulse of the master line timing signal C1. While being received, pairs of bits in these data are also ANDed by the AND gate 33, and exclusively ORed (XORed) by the exclusive-OR gate 34. The ANDed data are selected by selector 37 as the final image signal V4. The final image signal V4 is latched in the LED printing head 6 in synchronization with a pulse of the latch signal C7, forming the data for a basic raster line. The basic raster line is then printed with an energy E1, the energy being controlled by the head data output processor 5. In the meantime, the exclusively ORed data are held in line buffer 36.

Next, the data that were exclusively ORed by the exclusive-OR gate 34 are read from the line buffer 36 through selectors 35 and 37, and become the next part of final image signal V4. This part of the final image signal V4 is latched in the LED printing head 6 in synchronization with another pulse of the latch signal C7, forming the data for an additional raster line. The additional raster line is printed with a smaller energy E2.

Figure 11:
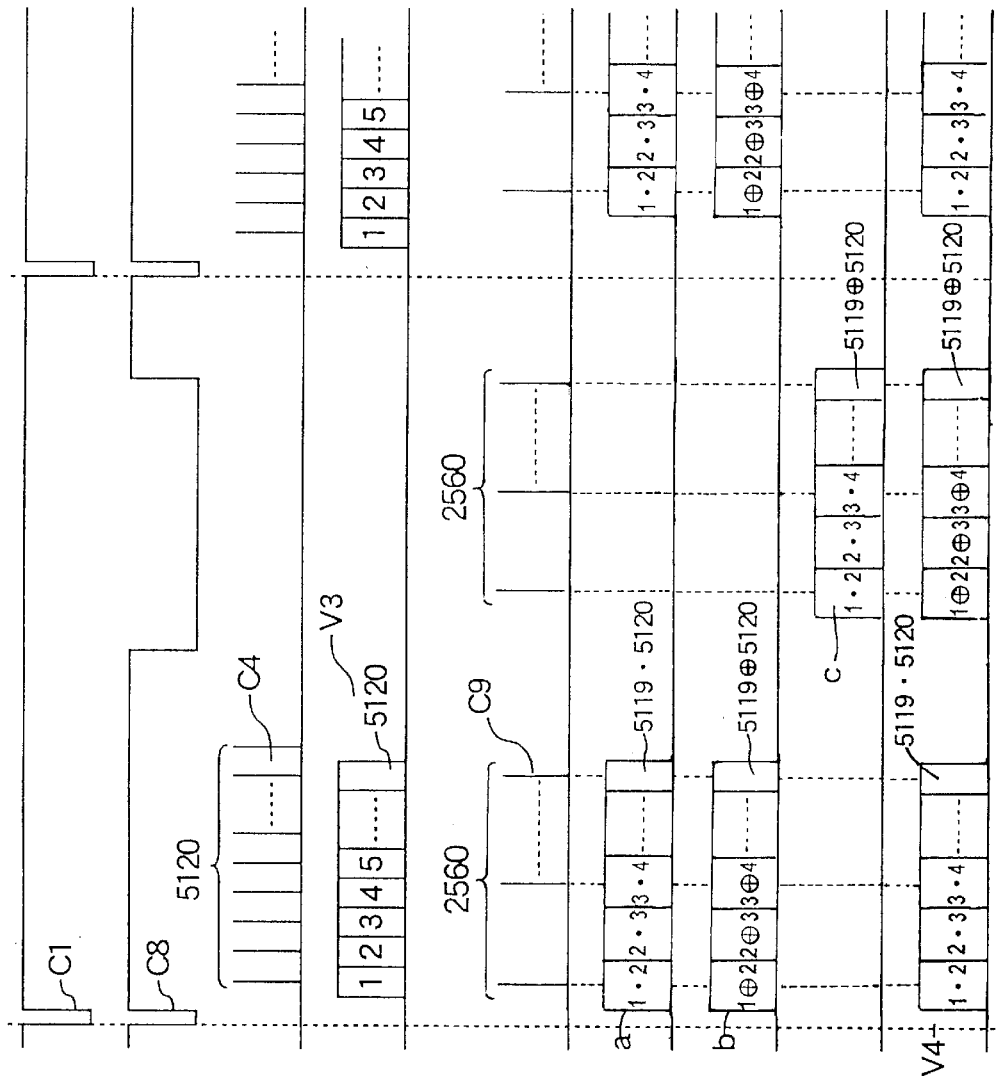
FIG. 11 is a more detailed timing diagram illustrating the operation of the smoothing processor in FIG. 1.

FIG. 11 illustrates the operations associated with the input of one raster line in more detail, showing the waveform of the dot selection signal C8 output by the frequency multiplier 42. During the interval while this signal is high, the master dot clock signal C6 (not visible) passes through AND gate 43 to produce five thousand one hundred twenty (5120) pulses of the dot transfer clock signal C4, in synchronization with which a like number of bits of dot data are received in the intermediate image signal V3.

These five thousand one hundred twenty pulses of the dot transfer clock signal C4 produce two thousand five hundred sixty pulses of the dot output clock signal C9. The logical AND (a) and logical exclusive OR (b) of successive pairs of bits in the final image signal V4 are output by the AND gate 33 and exclusive-OR gate 34 in synchronization with the dot output clock signal C9. The logically ANDed data (a) are selected by selector 37 as the final image signal V4, while the exclusively ORed data (b) are selected by selector 35 for storage in the line buffer 36.

During the succeeding interval while the dot selection signal C8 is low, AND gate 43 blocks the output of further pulses of the dot transfer clock signal C4, so no further data are received, although the clock generator 40 continues to output the master dot clock signal C6. From the master dot clock signal C6, D-type flip-flop 39 and delay circuit 38 generate another two thousand five hundred sixty pulses of the dot output clock signal C9, in synchronization with which the exclusively ORed data (c) are read from the line buffer 36 and output as the final image signal V4.

Figure 12A:
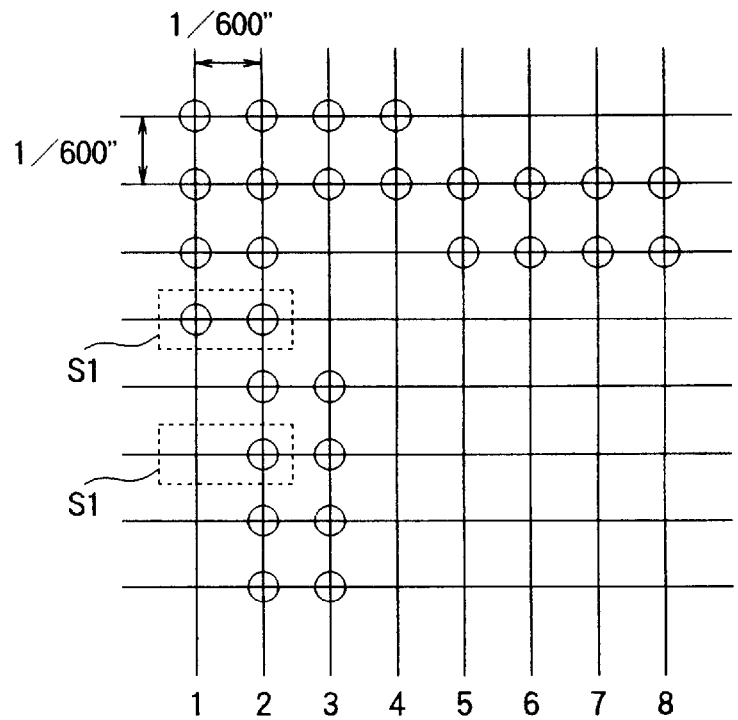
FIGS. 12A and 12B illustrate the general operation of the smoothing processor in FIG. 1 in the printing of a certain image.
Figure 12B:
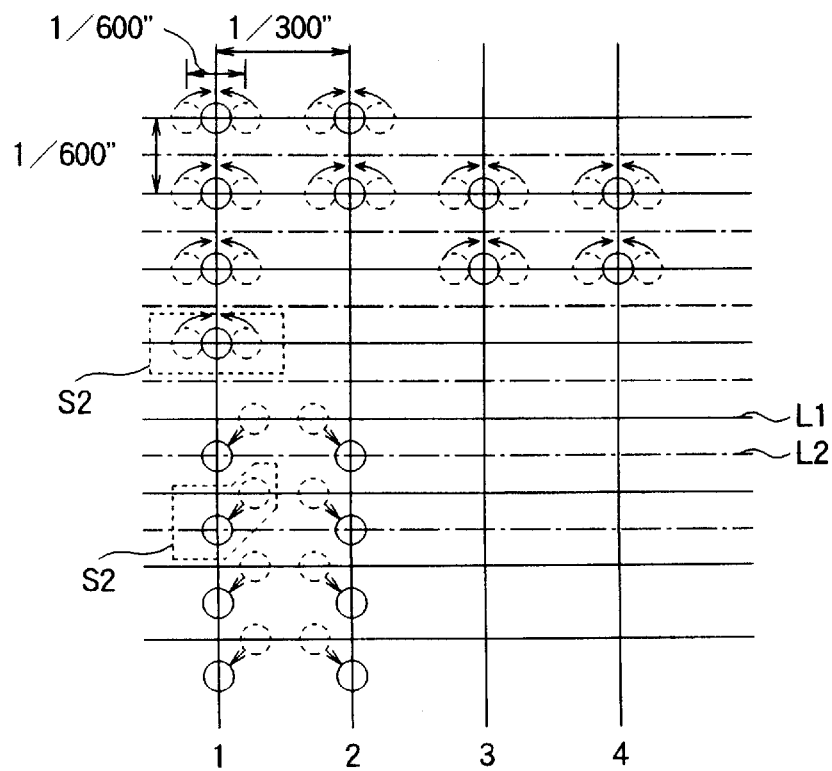

FIGS. 12A and 12B illustrate the smoothing of part of an image. This image is intended to illustrate the operation of the smoothing processor 4, and is not necessarily an image output by the resolution multiplier 3.

FIG. 12A shows the 600-DPI image data input to the smoothing processor 4. FIG. 12B shows the image data output by the smoothing processor 4, which have a resolution of 300 DPI horizontally and 1200 DPI vertically. The solid horizontal lines $L_1$ in FIG. 12B are basic raster lines, while the dash-dot lines $L_2$ are additional raster lines. The numbers at the bottom of FIGS. 12A and 12B represent dot positions in the raster lines.

The circles with solid circumferences in FIG. 12B represent dots output by the smoothing processor 4, generated by logical AND operations and exclusive-OR operations. The dotted circles in FIG. 12B represent the source dots in FIG. 12A. The dots in the two areas marked S1 in FIG. 12A generate the dots in the areas marked S2 in FIG. 12B. On raster lines having black dots in adjacent positions one and two in FIG. 12A, for example, the logical AND of these dots produces a black dot on a basic raster line in FIG. 12B. If only one of the dots in positions one and two is black, the exclusive-OR operation produces a black dot on an additional raster line in FIG. 12B.

FIGS. 13A, 13B, and 13C show how a nearly-vertical slanted line two dots wide is smoothed by the smoothing processor 4. FIG. 13A indicates the data input to the smoothing processor 4, using small circles to represent black dots. FIG. 13B indicates the output of the smoothing processor 4, using circles of different sizes to indicate that dots on the basic raster lines $L_1$ are printed with more energy than dots on the additional raster lines $L_2$. FIG. 13C indicates how the human eye interprets the resulting printed image.

Figure 14A:
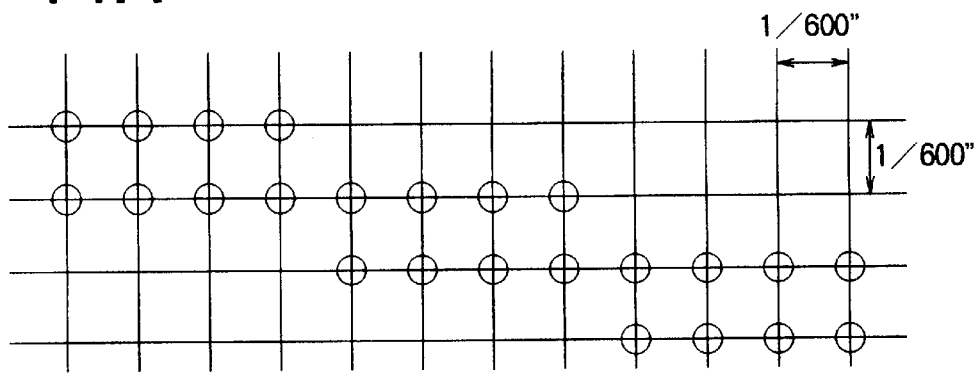
FIGS. 14A, 14B, and 14C illustrate the general operation of the smoothing processor in FIG. 1 in the printing of a nearly horizontal line two dots thick.
Figure 14B:
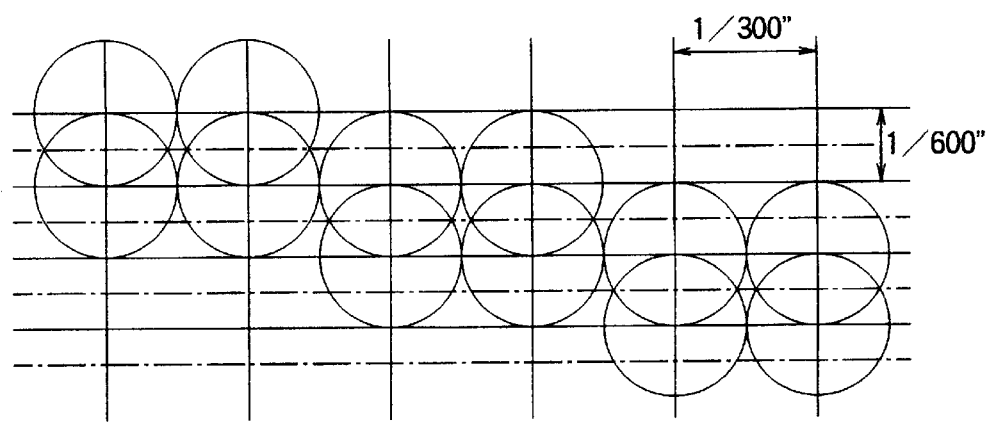
Figure 14C:
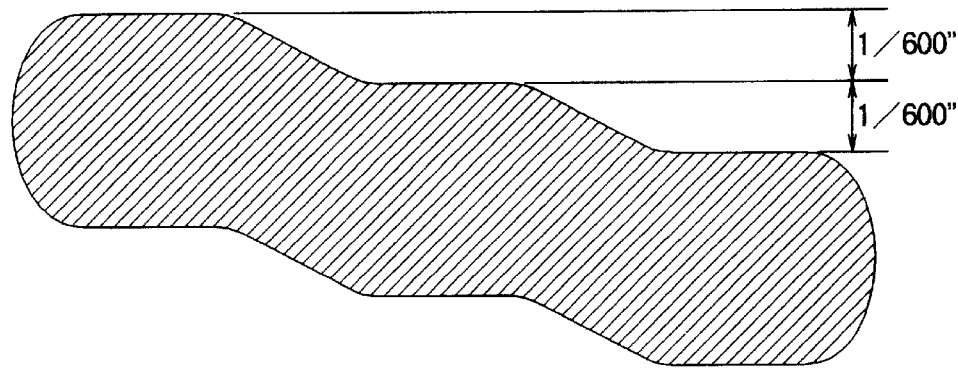

Similarly, FIGS. 14A, 14B, and 14C show how a nearly-horizontal slanted line two dots wide is smoothed by the smoothing processor 4. FIG. 14A indicates the data input to the smoothing processor 4, FIG. 14B indicates the output of the smoothing processor 4, and FIG. 14C depicts the visual appearance of the printed image.

Figure 15A:
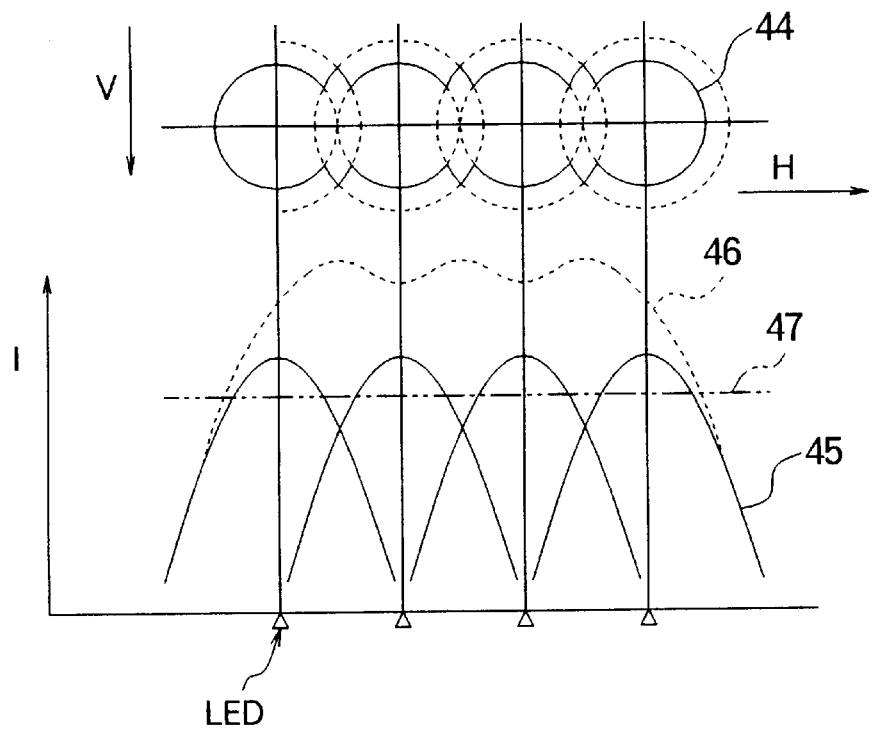
FIGS. 15A and 15B illustrate the printing of adjacent dots at two energy levels.
Figure 15B:
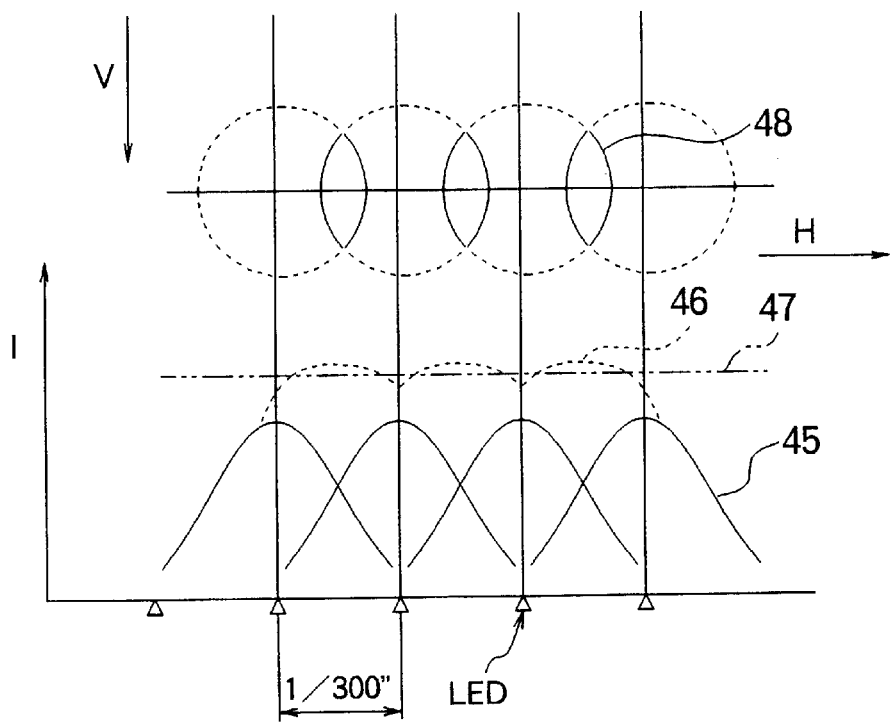

FIGS. 15A and 15B show two examples of the combining of adjacent dots in the printed image. Both drawings show a row of printed dots and a graph of the illumination intensity profile produced by the LED printing head 6 along a line through the center of the row. The vertical axis in each graph represents optical intensity. The triangular marks on the horizontal axis indicate the position of LEDs in the LED printing head 6.

In FIG. 15A, the LEDs are driven with enough energy that the dots 44 merge together. In the graph, the solid curves 45 represent the optical output of the individual LEDs, the dotted curve 46 represents their combined output, and the horizontal line 47 represents the response threshold of the photosensitive drum illuminated by the LED printing head 6. The energy in FIG. 15A corresponds conceptually to the energy E1 used on basic raster lines in the first embodiment.

In FIG. 15B, the LEDs are driven with less energy, and the optical output curves 45 fall short of the response threshold 47, but the combined curve 46 exceeds the response threshold 47 in locations where two dots overlap. These overlapping parts become printed dots 48. The energy in FIG. 15B is lower than the energy E2 used on additional raster lines in the first embodiment, but illustrates the general effect of reducing the energy and shows how dots can be formed between LED positions.

Figure 16:
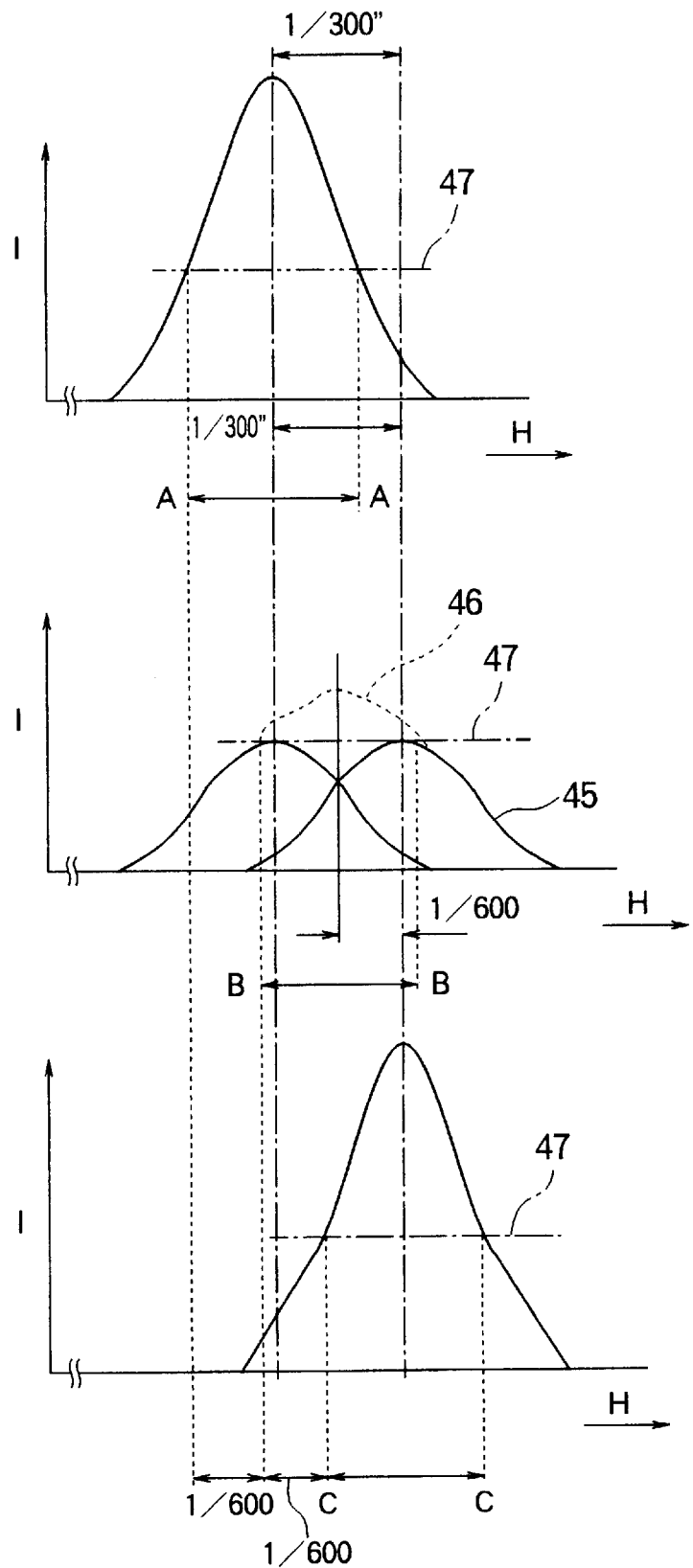
FIG. 16 illustrate energy profiles through lines A—A, B—B, and C—C in FIGS. 13B and 13C.

FIG. 16 shows similar optical intensity profiles through sections A—A, B—B, and C—C in FIGS. 13B and 13C. In section B—B, two adjacent dots printed with energy E2 on an additional raster line combine to form one dot with substantially the same size as the individual dots printed on the basic raster lines at A—A and C—C.

Figure 17A:
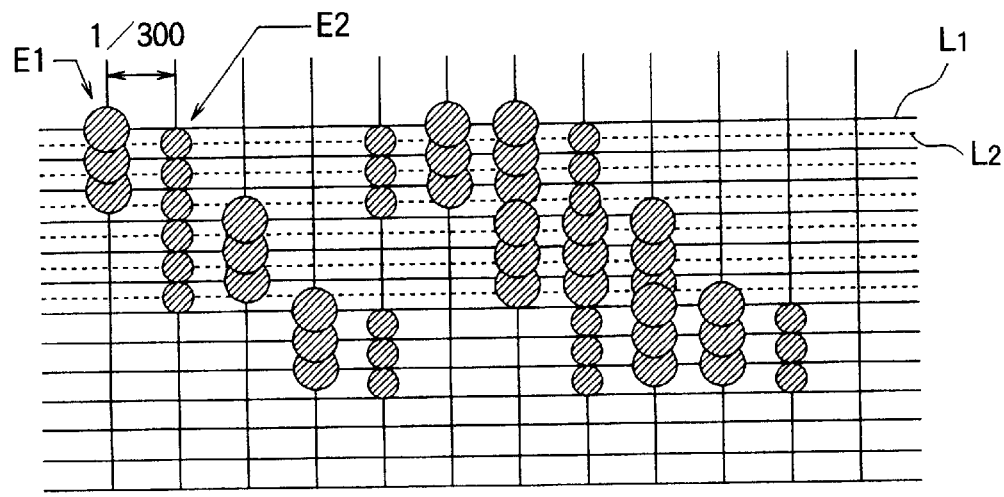
FIGS. 17A and 17B illustrate the printing of the image in FIG. 8A by the first embodiment.
Figure 17B:
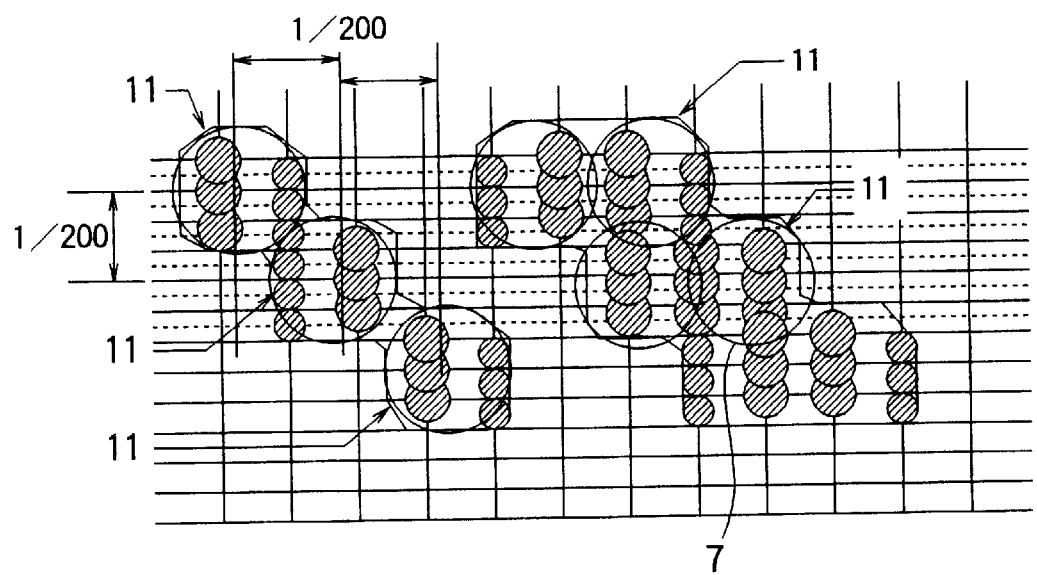

FIGS. 17A and 17B show how the 200-DPI image in FIG. 8A is printed by the first embodiment. The smoothing processor 4 converts the corresponding 600-DPI intermediate image output by the resolution multiplier 3 (shown in FIG. 8B) to the final image in FIG. 17A, having a horizontal resolution of 300 DPI and a vertical resolution of 1200 DPI. The solid horizontal lines $L_1$ represent basic raster lines, while the dotted horizontal lines $L_2$ represent additional raster lines. The different dot sizes correspond to the different printing energies E1 and E2.

When printed, this 300-DPI/1200-DPI final image produces visual equivalent dots 11, identified by polygons in FIG. 17B, that closely match the locations of the original dots 7 in the 200-DPI image. The locations of the original dots 7 are shown by circles in FIG. 17B.

It remains to determine the optimal relative values of the printing energy E1 and E2. FIGS. 15B and 16 have shown that values of E2 too low to print an individual dot can still print a dot in the space between two adjacent dots on an additional raster line, but FIGS. 17A and 17B have shown that it may be necessary to print isolated dots on additional raster lines. The value of energy E2 is therefore set higher than shown in FIGS. 15B and 16.

Figure 18:
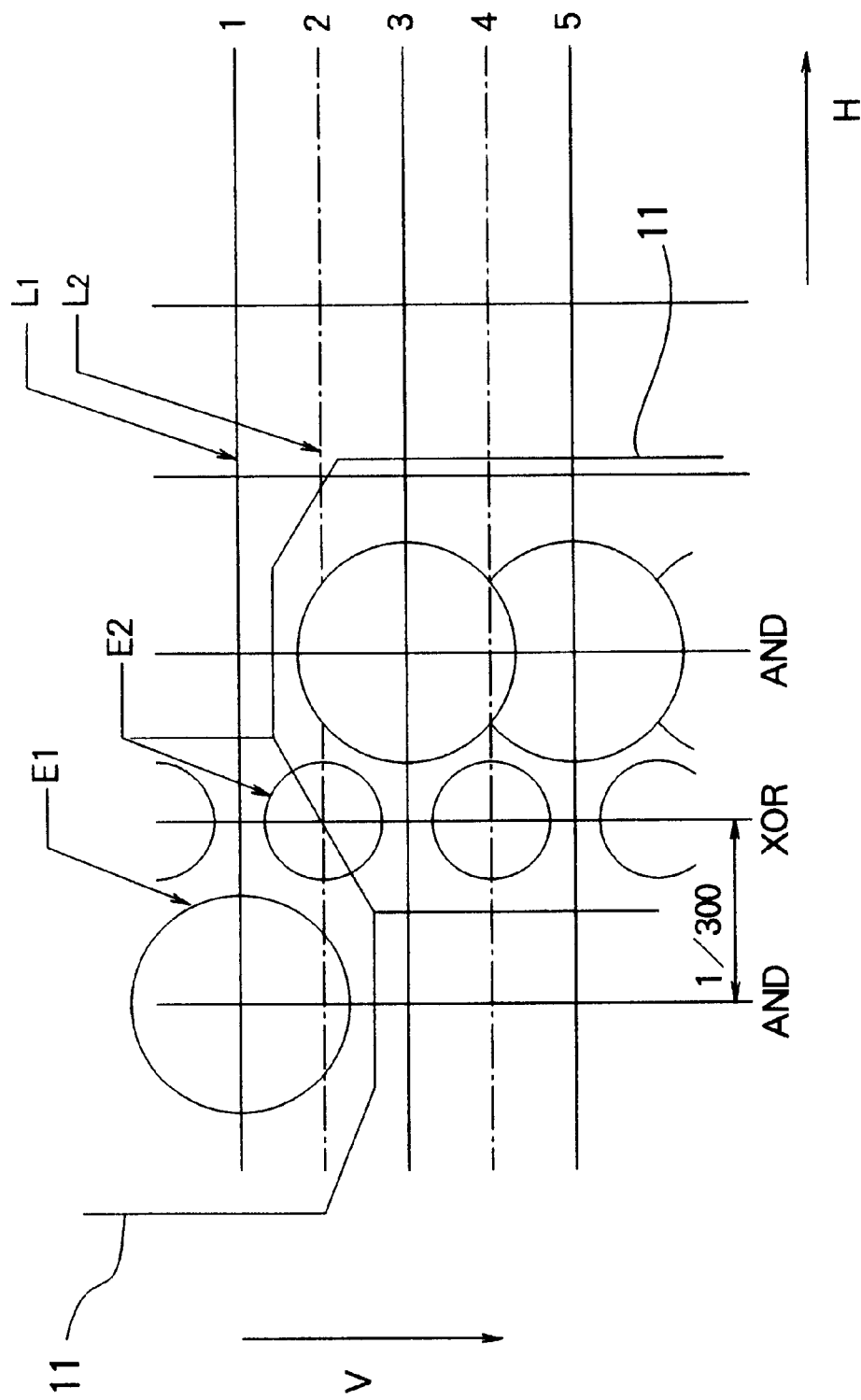
FIG. 18 is an enlargement of part of FIG. 17B.
Figure 19:
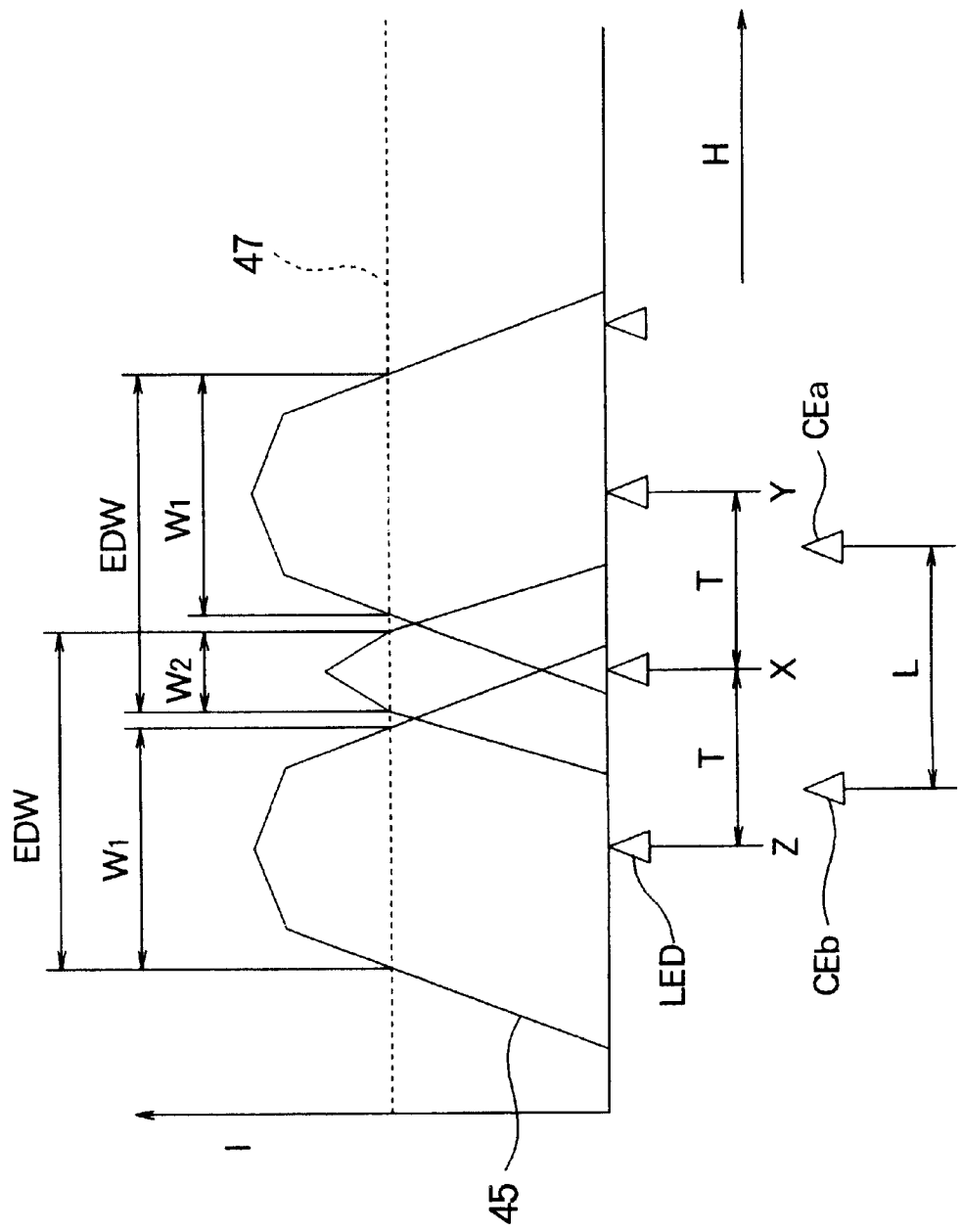
FIG. 19 illustrates energy profiles in FIG. 18.

FIG. 18 shows an enlargement of part of FIG. 17A around the point of adjacency of two equivalent dots 11, with the vertical line spacing doubled for clarity. FIG. 19 schematically shows the corresponding illumination intensity profiles 45 of an additional dot produced by a LED X by printing on an additional raster line with energy E2, and two basic dots produced by adjacent LEDs Y and Z by printing on basic raster lines with energy E1. The intensity profile of the additional dot centered at X must go above the response threshold 47 of the photosensitive drum, as shown; otherwise, the additional dot will not be printed.

As shown in FIG. 19, the width (EDW) of an equivalent dot is equal to $T+W_1/2+W_2/2$, where T is the interval ($1/300"$) between LEDs, $W_1$ is the width of a basic dot, and $W_2$ is the width of an additional dot. To reproduce the 200-DPI image as faithfully as possible, it is desirable for the interval L between the centers (CEa and CEb) of the equivalent dots to be $1/200"$, or $3T/2$. If the difference between $W_1$ and $W_2$ is equal to T, then following relations are all true, and L has the desired value.

$$CEa = X - W_2/2 + EDW/2$$
$$= X + T/2 + W_1/4 - W_2/4$$

-continued
$$CEb = X + W_2/2 - EDW/2$$
$$= X - T/2 - W_1/4 + W_2/4$$
$$L = CEa - CEb$$
$$= T + W_1/2 - W_2/2$$
$$T = W_1 - W_2$$
$$T/2 = W_1/2 - W_2/2$$
$$L = T + T/2$$
$$= 3T/2$$

The relative values of E1 and E2 should therefore be set so that the difference between the width of a basic dot and the width of an additional dot is equal to the LED spacing, or $1/300"$.

When this condition is satisfied, the first embodiment enables a 200-DPI image to be printed by a 300-DPI LED printing head 6 with substantially no loss of image quality. Fine lines appear to be printed with substantially uniform thickness, and dithered images are reproduced without moire patterns. Furthermore, this effect is reliably achieved by inexpensive circuitry employing flip-flops, AND gates, line buffers, and the like. There is no need for complex and dubiously reliable processing to recognize text and non-text parts of an image.

Next, a second embodiment will be described. The second embodiment will be presented as an adaptation of the first embodiment, made in order to print at a vertical resolution of 400 DPI instead of 1200 DPI.

Figure 20:
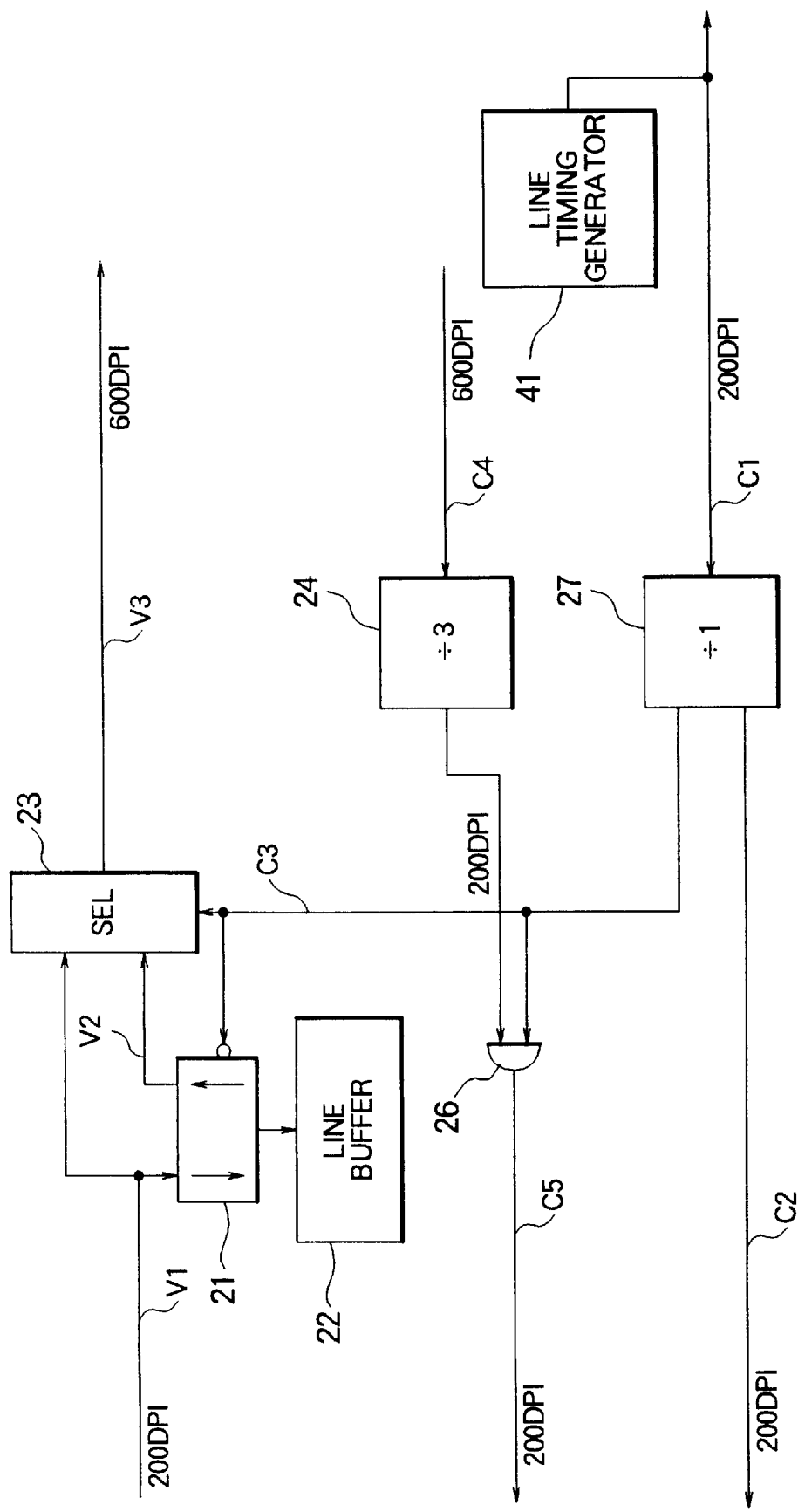
FIG. 20 schematically illustrates the resolution multiplier and part of the smoothing processor in a second embodiment of the invention.

FIG. 20 shows the resolution multiplier 3 and part of the smoothing processor 4 in the second embodiment, using the same reference numerals as in the first embodiment, but replacing the frequency divider 25 of the first embodiment with another frequency divider 27. This frequency divider 27 is configured as a divide-by-one frequency divider. The line input timing signal C2 is identical to the master line timing signal C1, and the line selection signal C3 is held permanently high. The master line timing signal C1, which is generated by the line timing generator 41 in the smoothing processor 4, has a lower frequency than in the first embodiment, being equivalent to 200 DPI instead of 600 DPI.

Figure 21:
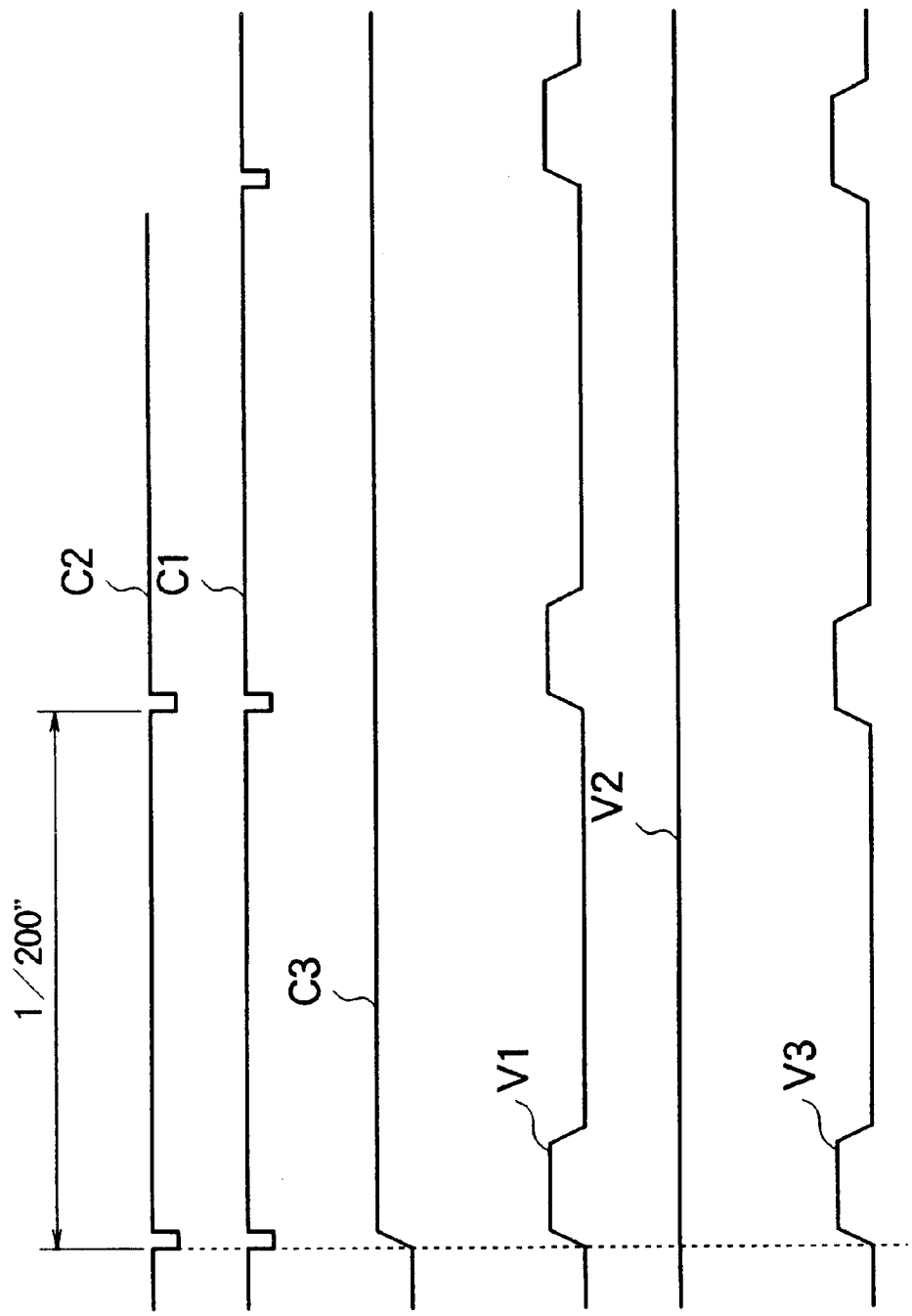
FIG. 21 is a timing diagram illustrating the operation of the second embodiment.

FIG. 21 illustrates the operational timing of the second embodiment. The master line timing signal C1 and line input timing signal C2 both comprise pulses that occur at intervals corresponding to $1/200"$ in the vertical scanning direction. Since the line selection signal C3 is permanently high, selector 21 does not read any data from the line buffer 22, the repeated image signal V2 is not used, and selector 23 always selects the bit-mapped input image signal V1 for output as the intermediate image signal V3. The resolution multiplier 3 accordingly converts each 200-DPI input raster line to just one 600-DPI intermediate raster line, instead of the three raster lines of the first embodiment.

Figure 22:
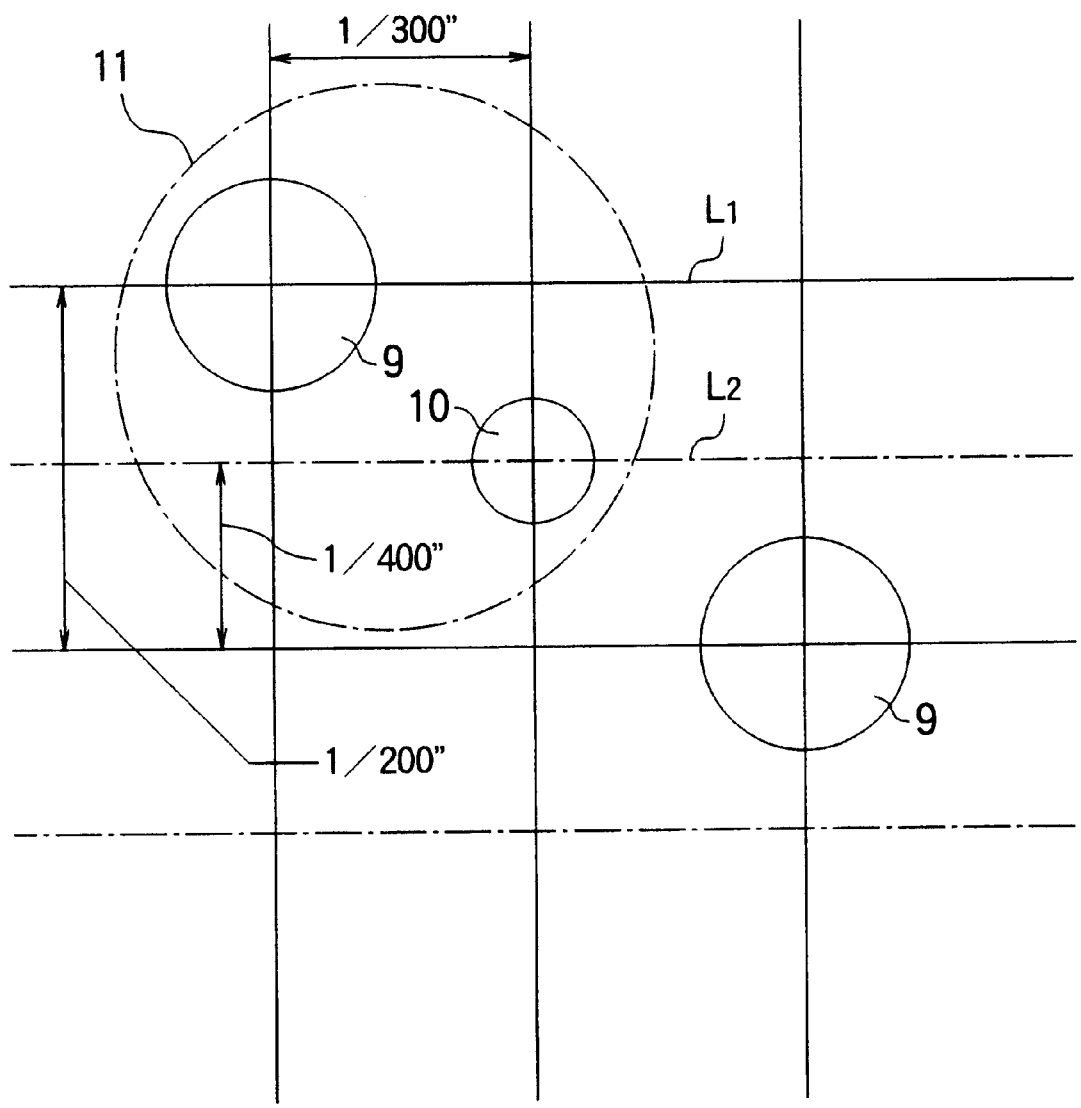
FIG. 22 illustrates an equivalent dot in the second embodiment.

FIG. 22 illustrates the printed result in the second embodiment. A single dot in the 200-DPI input image is converted to an equivalent dot 11 comprising just one basic dot 9 and just one additional dot 10 in the final image. The basic raster lines $L_1$ are printed at intervals of $1/200"$. The spacing between basic raster lines $L_1$ and additional raster lines $L_2$ is $1/400"$. The dot spacing in the horizontal direction remains $1/300"$.

Compared with the equivalent dots in the first embodiment, which included three basic dots 9 and three additional dots 10 each, the equivalent dots 11 in the second embodiment have a less dot-like shape, but at two hundred equivalent dots per inch, the shape of the equivalent dots 11 is not readily detected by the human eye. The second embodiment has the same general effect as the first embodiment, enabling a 300-DPI LED printing head 6 to reproduce a 200-DPI image with negligible loss of image quality.

An advantage of the second embodiment, as compared with the first embodiment, is that since only one-third as many raster lines are printed, the signal frequencies need be only one-third as high. Less electromagnetic interference (EMI) is therefore generated. If the 1200-DPI vertical resolution employed in the first embodiment would lead to difficulties in EMI suppression, the second embodiment can be used to avoid these difficulties.

The lower signal speeds in the second embodiment also imply that less expensive components can be used. The cost of the second embodiment can be further reduced by eliminating the selectors 21 and 23, line buffer 22, AND gate 26, and frequency divider 27, as these elements essentially perform no function in the second embodiment.

Next, a third embodiment of the invention will be described. The third embodiment enables a 300-DPI LED printing head 6 to print both ordinary facsimile images having a vertical resolution of 200 DPI, and facsimile images scanned in the so-called super-fine mode with a vertical resolution of 400 DPI.

Figure 23:
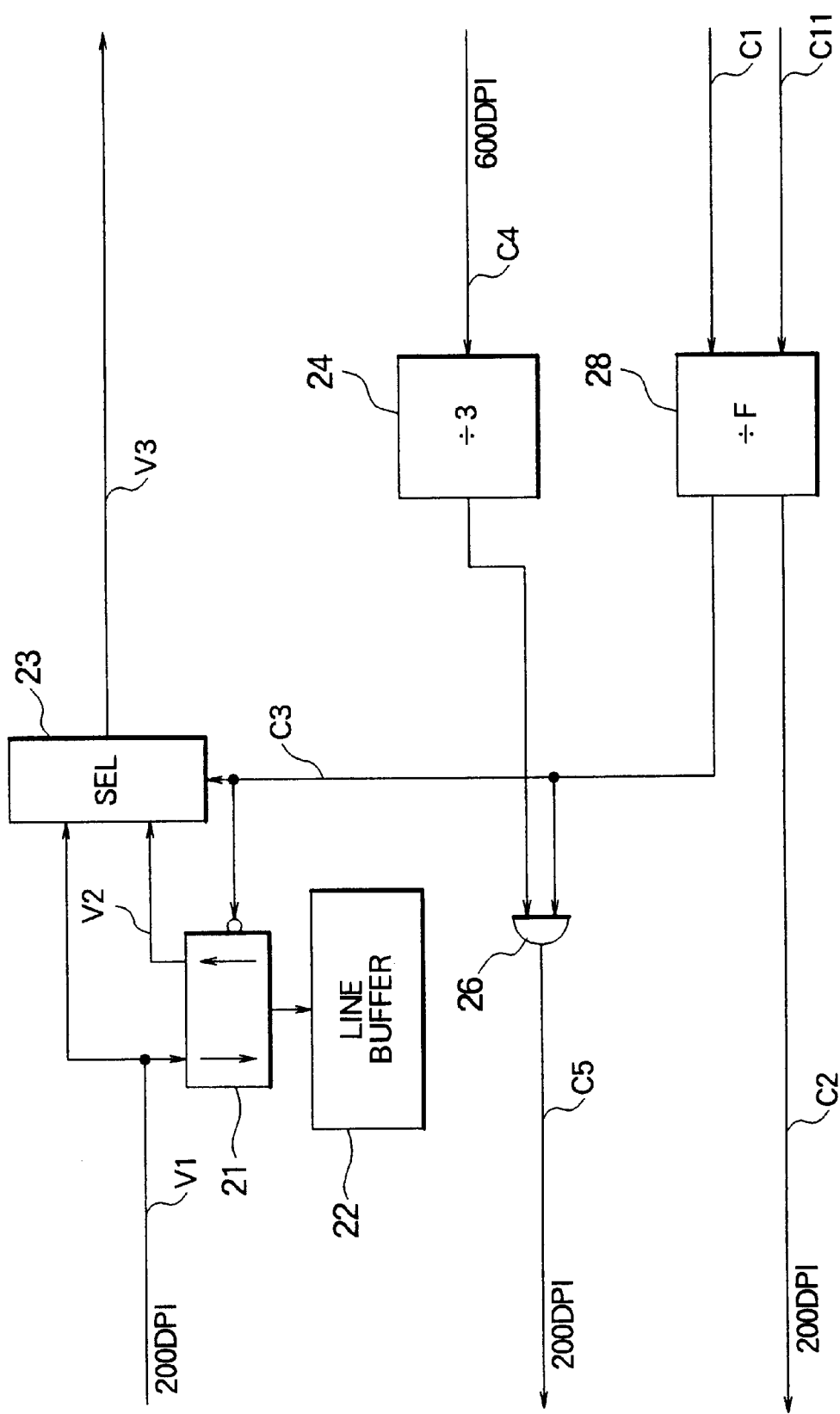
FIG. 23 schematically illustrates the resolution multiplier in a third embodiment of the invention.

Referring to FIG. 23, in the resolution multiplier 3, the third embodiment replaces the frequency divider 25 of the first embodiment with a variable frequency divider 28 that divides the frequency of the master line timing signal C1 by a factor F selected by a factor selection signal C11. The other elements of the resolution multiplier 3 are the same as in the first embodiment, and have the same reference numerals as in FIG. 5.

Figure 24:
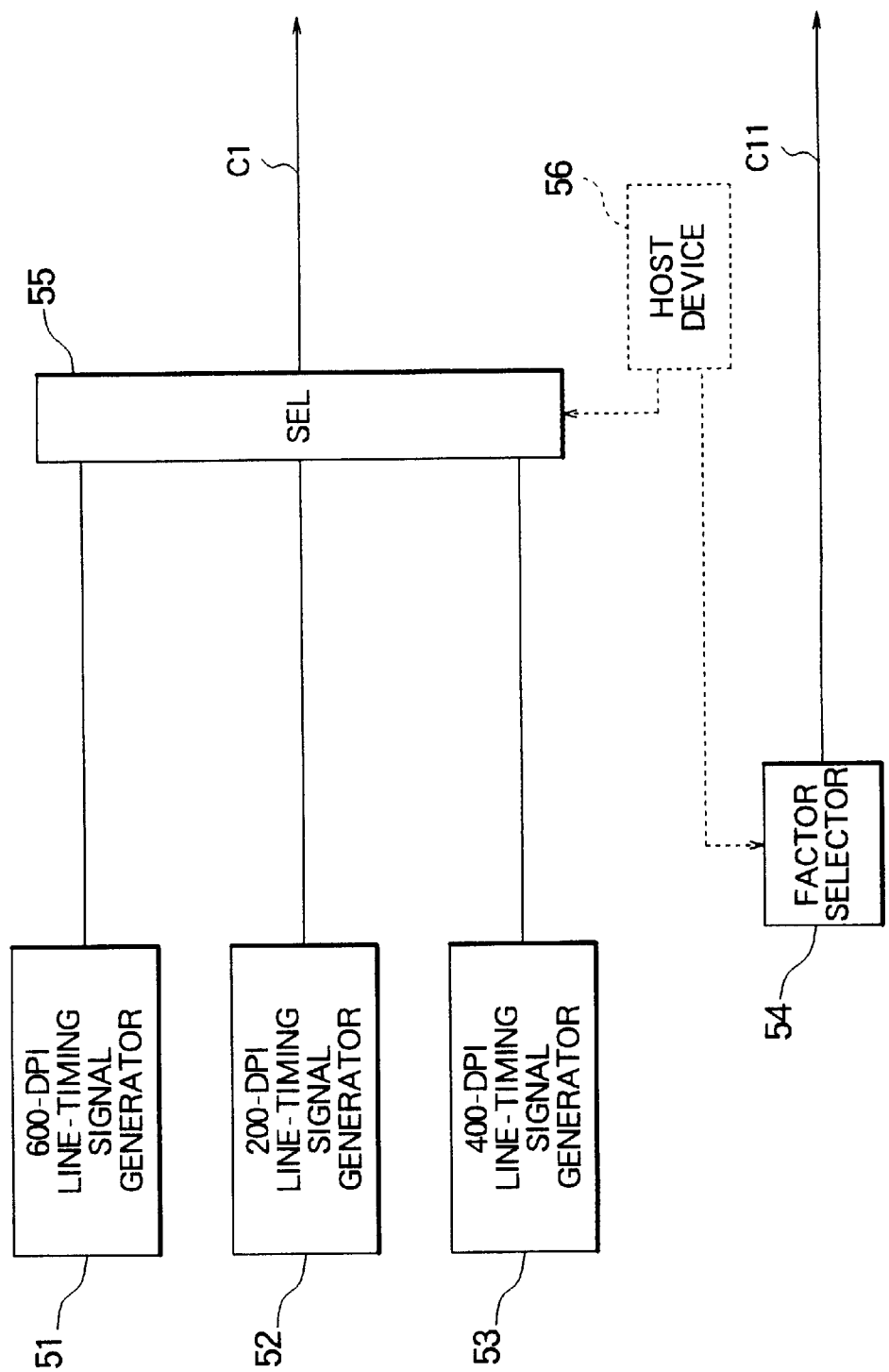
FIG. 24 schematically illustrates the line timing generator in the third embodiment.

FIG. 24 shows the internal structure of the line timing generator in the smoothing processor 4 in the third embodiment. The line timing generator in the third embodiment has a 600-DPI line timing signal generator 51, a 200-DPI line timing signal generator 52, a 400-DPI line timing signal generator 53, a frequency-division factor selector 54 that outputs the factor selection signal C11, and a selector 55 that selects one of the line timing signals output by line timing signal generators 51, 52, and 53 as the master line timing signal C1. The frequency-division factor selector 54 and selector 55 are controlled by signals from the host device 56.

In ordinary facsimile reception, the host device 56 directs the frequency-division factor selector 54 to output a factor selection signal C11 that causes the variable frequency divider 28 in the resolution multiplier 3 to select a frequency-division factor F equal to one, and directs selector 55 to select the 200-DPI line timing signal output by line timing signal generator 52. The third embodiment then operates in the same way as the second embodiment.

When high-quality printed output of an ordinary facsimile image is required, the host device directs the frequency-division factor selector 54 to output a factor selection signal C11 that causes the variable frequency divider 28 to select a frequency-division factor F equal to three, and directs selector 55 to select the 600-DPI line timing signal output by line timing signal generator 51. The third embodiment then operates in the same way as the first embodiment.

When a super-fine facsimile image is received, the host device directs the frequency-division factor selector 54 to output a factor selection signal C11 that causes the variable frequency divider 28 to select a frequency-division factor F equal to one, and directs selector 55 to select the 400-DPI line timing signal output by line timing signal generator 53. The third embodiment illustrated as illustrated in FIG. 25.

Figure 25:
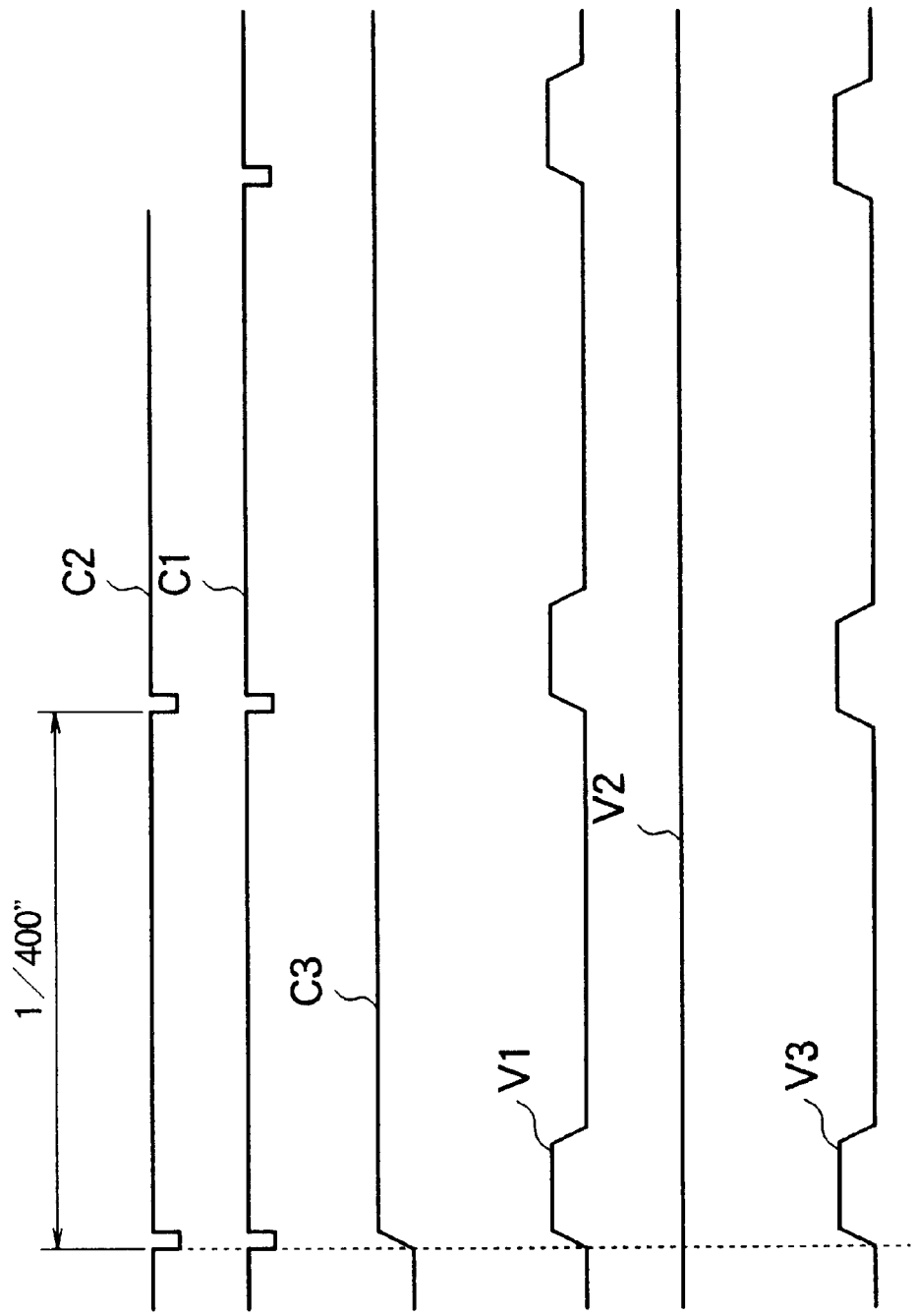
FIG. 25 is a timing diagram illustrating the operation of the third embodiment.
Figure 26:
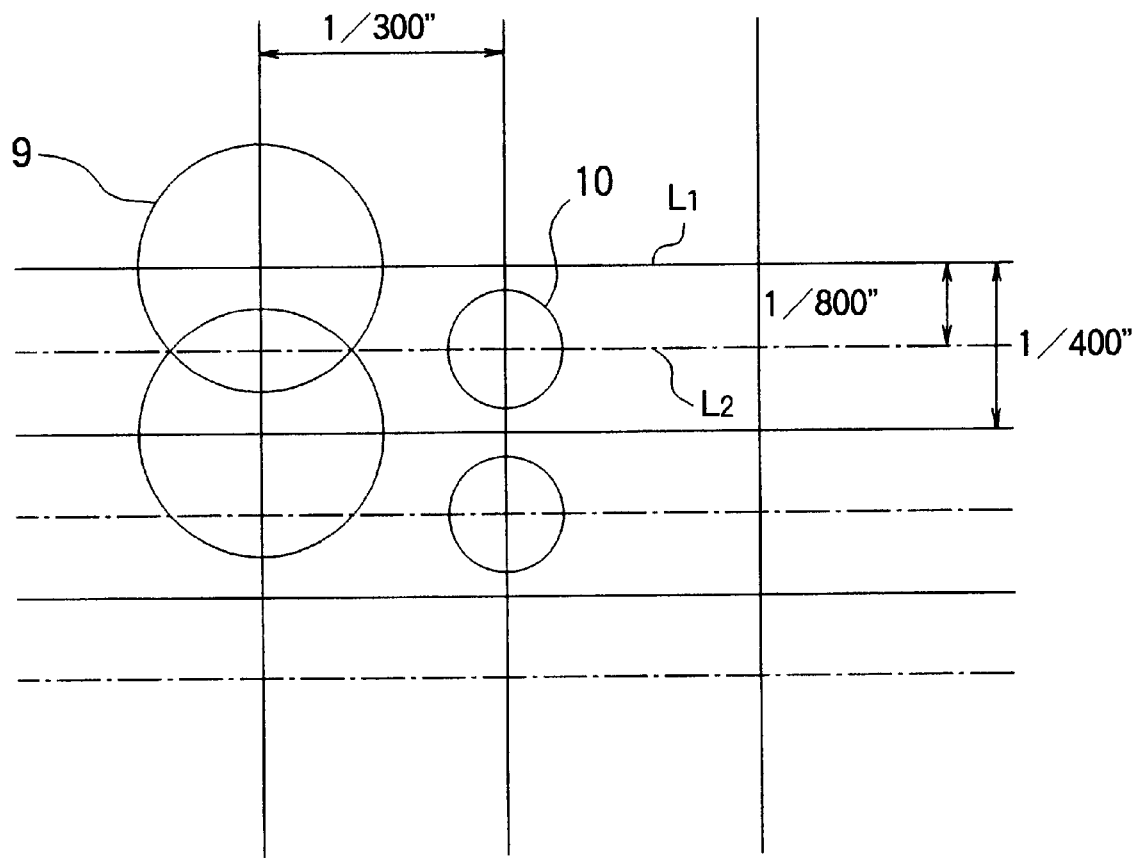
FIG. 26 illustrates the printing of a super-fine facsimile image by the third embodiment.

FIG. 25 is identical to FIG. 21 except that the pulses of the master line timing signal C1 and line input timing signal C2 occur at intervals equivalent to $\frac{1}{400}$" in the vertical scanning direction. The line selection signal C3 remains high, no data are read into repeated image signal V2, and the bit-mapped input image signal V1 is always selected for output as the intermediate image signal V3. The final image is printed as shown in FIG. 26, each dot in the original super-fine image generating one basic dot 9 and one additional dot 10, the dot spacing being $\frac{1}{300}$" in the horizontal scanning direction, the spacing between basic raster lines $L_1$ being $\frac{1}{400}$", and the spacing between a basic raster line $L_1$ and the adjacent additional raster line $L_2$ being $\frac{1}{800}$". The vertical resolution is accordingly 800 DPI.

The third embodiment provides the capabilities of both the first and second embodiments, with the additional capability to print super-fine facsimile images. Printing such images by the method of the first embodiment would require a vertical resolution of 2400 DPI, taxing the capabilities of electronic components and raising serious problems of electromagnetic interference.

Next, a fourth embodiment will be described. The fourth embodiment adds to the second embodiment the capability to print, on one page, facsimile images that exceed the length of the page.

Figure 27:
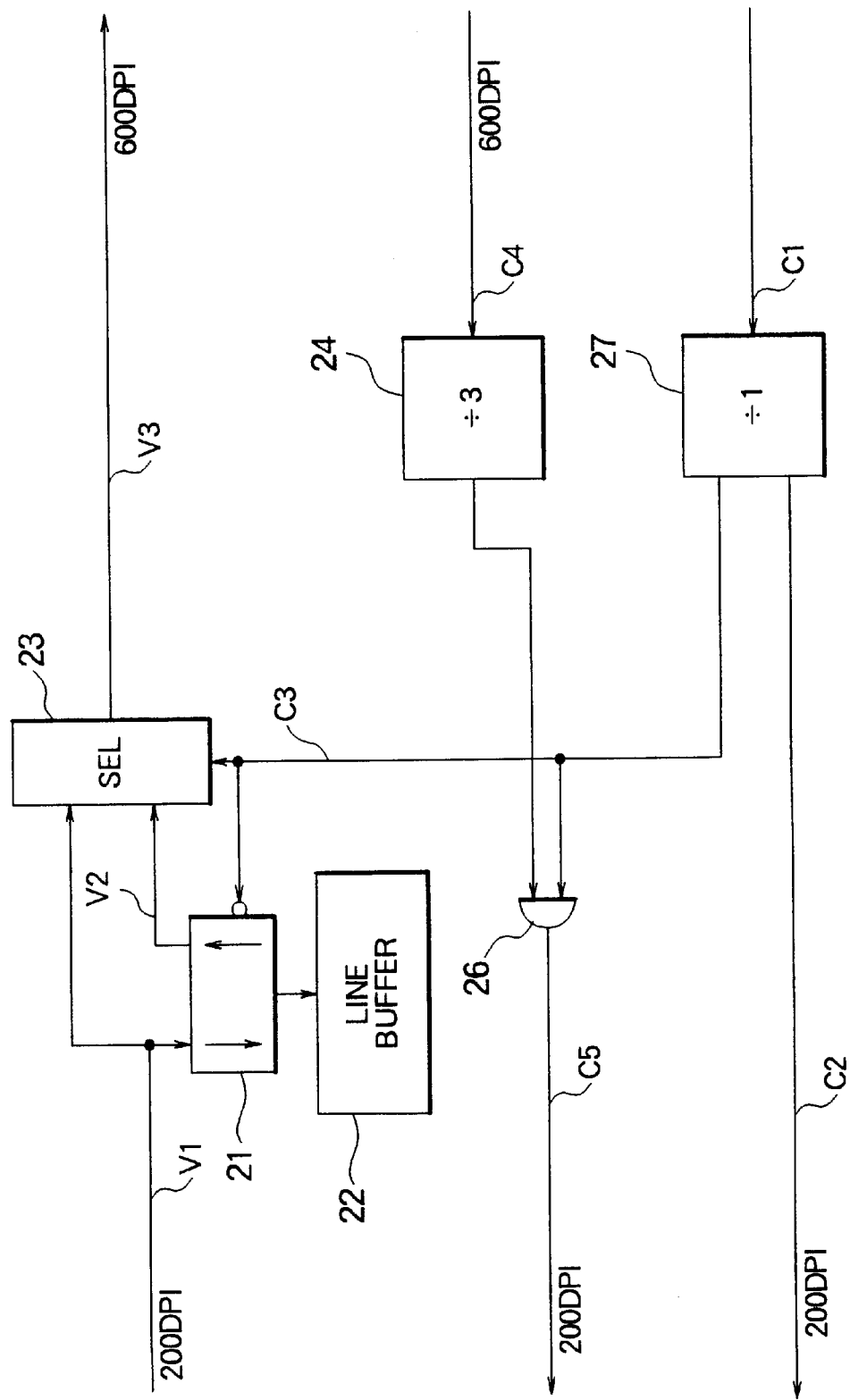
FIG. 27 schematically illustrates the resolution multiplier in a fourth embodiment of the invention.

FIG. 27 shows the resolution multiplier 3 in the fourth embodiment, using the same reference numerals as in FIG. 21. The resolution multiplier 3 in the fourth embodiment is substantially identical to the resolution multiplier 3 in the second embodiment.

Figure 28:
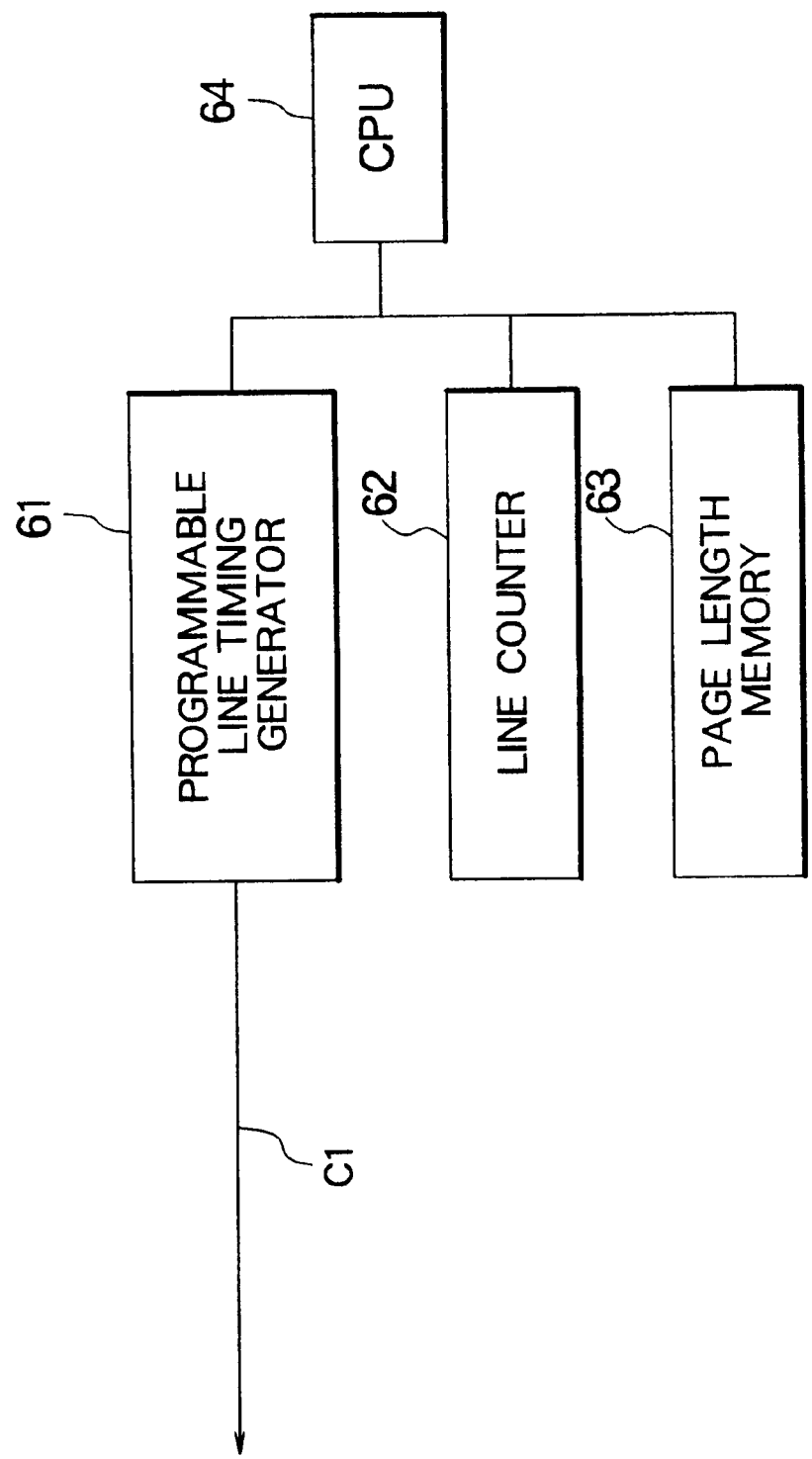
FIG. 28 schematically illustrates the line timing generator in the fourth embodiment.

FIG. 28 shows the line timing generator in the smoothing processor 4 in the fourth embodiment, which comprises a programmable line timing generator 61, a line counter 62, a page length memory 63, and a central processing unit (CPU) 64. The programmable line timing generator 61 is similar to the line timing generator 41 in the second embodiment, but outputs pulses at a programmable rate instead of a fixed rate. The central processing unit 64 is, for example, a microprocessor that controls the overall operations of the LED printer, including the receiving of image data from a connected personal computer or workstation. The line counter 62 is a counter adapted to count raster lines in the received data, by counting end-of-line codes detected by the central processing unit 64, for example. The page length memory 63 is, for example, a memory location in a non-volatile memory accessed by the central processing unit 64. The page length memory 63 stores a numeric value indicating the number of lines that can be printed on one page at a vertical resolution of 200 DPI.

The page printed by the fourth embodiment is, for example, a letter-size page with a length of eleven inches (11"), or an A4-size page with a length of two hundred ninety-seven millimeters (297 mm). If the 200-DPI image to be printed is an image of a legal-size page with a length of fourteen inches (14"), the line counter 62 will count a number of lines exceeding the value stored in the page length memory 63. The central processing unit 64 then calculates the ratio of the number of received lines to the value in the page length memory 63, and programs the programmable line timing generator 61 according to this ratio.

Suppose, for example, that in printing at a vertical resolution of two hundred basic raster lines per inch (200 basic dots per inch), the programmable line timing generator 61 outputs pulses at intervals of eight hundred microseconds (800 μs). If the number of lines in an image to be printed exceeds the value in the page length memory 63 by a ratio of 1.2:1, the central processing unit 64 programs the programmable line timing generator 61 to output pulses at intervals of substantially six hundred sixty-seven microseconds (800/1.2=667 μs).

Figure 29:
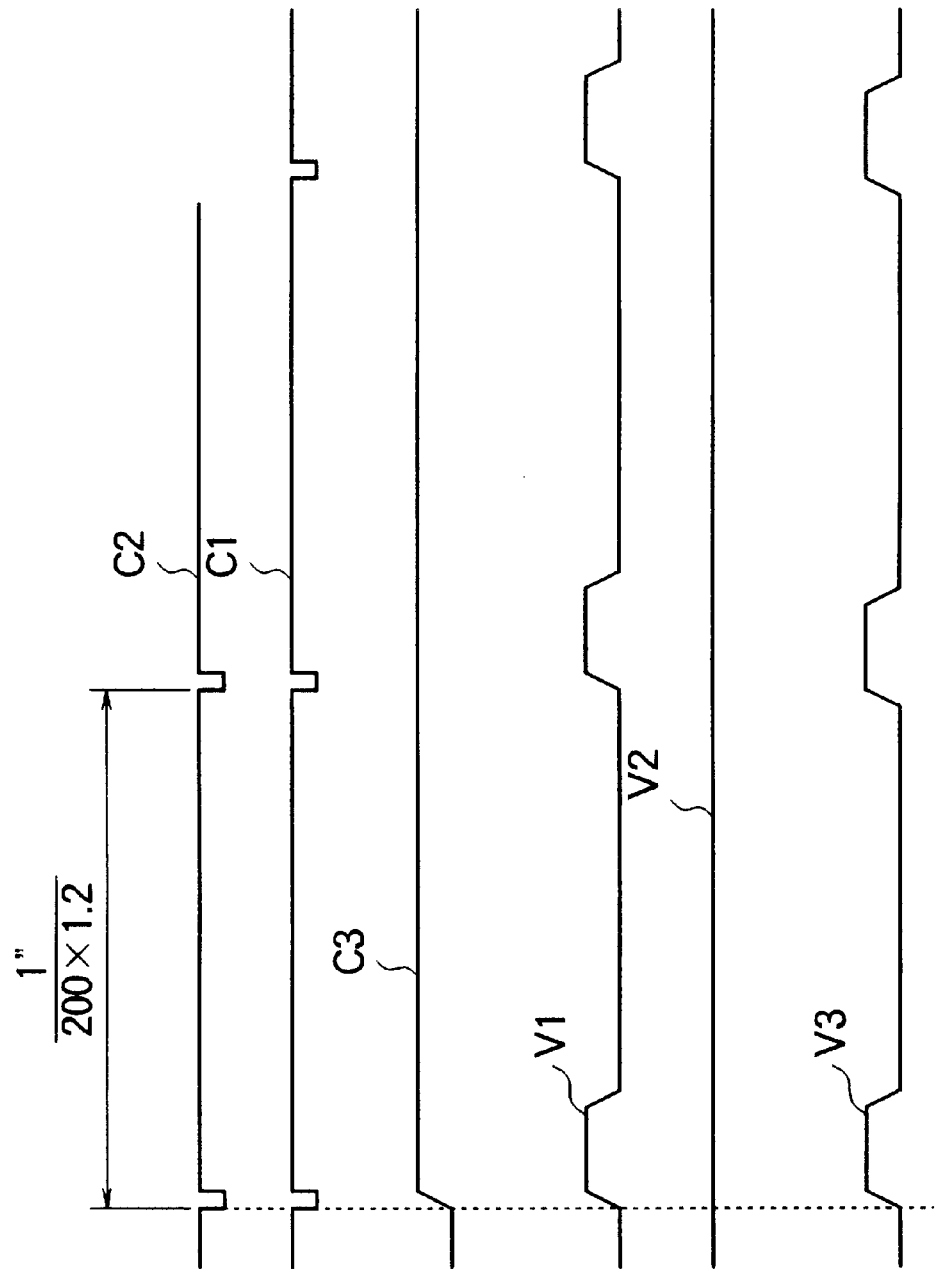
FIG. 29 is a timing diagram illustrating the operation of the fourth embodiment.

The fourth embodiment then operates as shown in FIG. 29, the intervals between pulses of the master line timing signal C1 and line input timing signal C2 corresponding to 1/(200×1.2)" in the vertical scanning direction. As in the second embodiment, the line selection signal C3 remains high, the repeated image signal V2 is not used, and the intermediate image signal V3 is identical to the bit-mapped input image signal V1. As a result, the entire image is printed on one page, vertically compressed by a factor of 1.2.

Besides solving the problem of conversion from 200 DPI to 300 DPI, the fourth embodiment solves the problem of printing facsimile images of pages that are slightly longer than the paper with which the printer is supplied, without skipping any raster lines, and without an unnatural division of the image into two pages. The slight vertical compression of the image does not cause unacceptable image distortion or render text illegible, and is preferable to the wasteful and confusing conventional practice of printing a small amount of left-over image data on a second page. The fourth embodiment is particularly useful in printing facsimile images of legal-size pages on letter-size or A4-size paper.

Next, a fifth embodiment of the invention will be described. The fifth embodiment adds to the first embodiment the capability to print 600-DPI input images.

Figure 30:
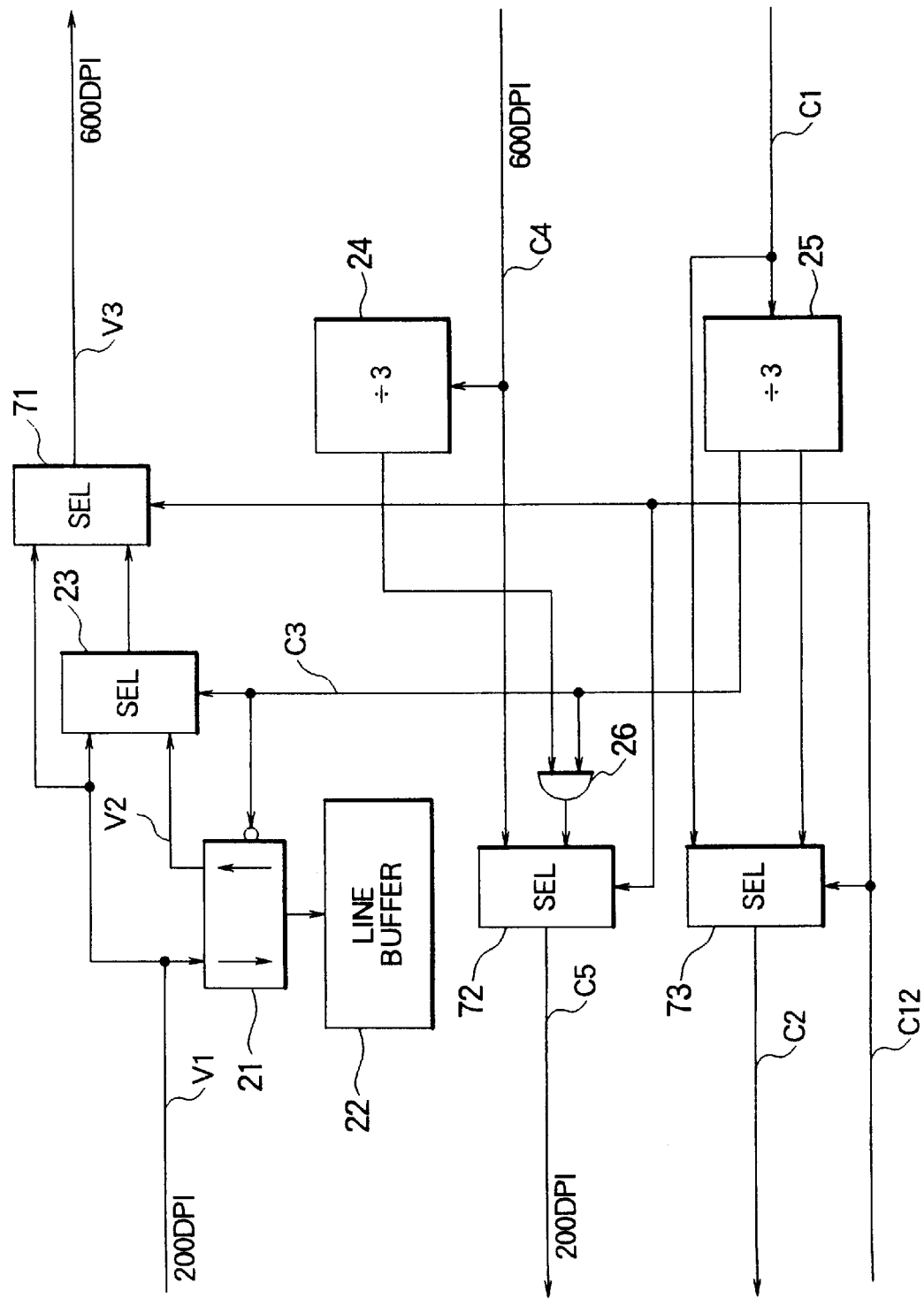
FIG. 30 schematically illustrates the resolution multiplier in a fifth embodiment of the invention.

When a 600-DPI image is received, the processing performed in the resolution multiplier 3 must be bypassed. Referring to FIG. 30, the fifth embodiment provides the elements present in the first embodiment, which have the same reference numerals as in FIG. 5, and three additional selectors 71, 72, and 73. These selectors 71, 72, and 73 are controlled by a resolution selection signal C12, which has one state for a 200-DPI input image and another state for a 600-DPI input image.

When the resolution selection signal C12 designates a 200-DPI image, selector 71 selects the output of selector 23 as the intermediate image signal V3, selector 72 selects the output of AND gate 26 as the dot input clock signal C5, selector 73 selects the output of frequency divider 25 as the line input timing signal C2, and the fifth embodiment operates in the same way as the first embodiment.

When the resolution selection signal C12 designates a 600-DPI image, selector 71 selects the bit-mapped input image signal V1 as the intermediate image signal V3, selector 72 selects the dot transfer clock signal C4 as the dot input clock signal C5, and selector 73 selects the master line timing signal C1 as the line input timing signal C2. The 600-DPI input image is then passed without alteration to the smoothing processor 4, for smoothing and conversion to 300 DPI (horizontally) and 1200 DPI (vertically).

Needless to say, all of the embodiments described above have the capability to print 300-DPI input images, by bypassing both the resolution multiplier 3 and the smoothing processor 4. The fifth embodiment can accordingly print images with any of three input resolutions: 200 DPI, 300 DPI, and 600 DPI.

The invention has been described in relation to conversion from 200 DPI to 300 DPI in the horizontal scanning direction, but the same embodiments can be use to convert between any two horizontal resolutions having a ratio of 1.5:1, by first multiplying the horizontal resolution by three, then smoothing and dividing the resolution horizontal resolution by two.

The invention can easily be adapted for other half-integer conversion ratios as well. To convert from 120 DPI to 300 DPI (a ratio of 2.5:1), for example, it suffices to have the resolution multiplier 3 multiply the horizontal resolution by five. In the first embodiment, frequency dividers 24 and 25 should divide the frequency of the master line timing signal C1 and dot transfer clock signal C4 by five instead of three, and selectors 21 and 23 should select the contents of the line buffer 22 four times instead of two times. In the general case, the frequency dividers 24 and 25 divide the frequency of the master line timing signal C1 and dot transfer clock signal C4 by an odd integer m, and the contents of the line buffer 22 are selected m−1 times. The operation of the smoothing processor 4 remains unchanged.

The invention is not limited to LED printers, but is also applicable to laser printers, ink-jet printers, thermal printers, and in general to any printers that form images from dots, preferably from dots of controllable size.

The printer need not be coupled to a personal computer or workstation. The invention can also be practiced in the printing apparatus used in copiers and facsimile machines, for example.

The features of the fourth and fifth embodiments can be combined with each other, or with features of the other embodiments, in the same printing apparatus.

Those skilled in the art will recognize that further variations are possible within the scope claimed below.

What is claimed is:

1. A method of printing a dot image having a first horizontal resolution at a second horizontal resolution which is a half-integer multiple of the first horizontal resolution, said dot image also having a certain first vertical resolution, comprising the steps of:

generating an intermediate image having a horizontal resolution equal to m times said first horizontal resolution, m being an odd integer greater than unity, and a vertical resolution not less than said first vertical resolution, by copying dots in said dot image;

smoothing said intermediate image while dividing the horizontal resolution of said intermediate image by two and doubling the vertical resolution of said intermediate image, thereby producing a final image with a horizontal resolution equal to said first horizontal resolution multiplied by m/2; and printing said final image at said first horizontal resolution multiplied by m/2.

2. The method of claim 1, wherein:

said final image comprises basic raster lines and additional raster lines, said basic raster lines alternating with said additional raster lines;

said basic raster lines have dots that are generated by logical AND operations on pairs of adjacent dots in said intermediate image; and said additional raster lines have dots that are generated by logical exclusive OR operations on pairs of adjacent dots in said intermediate image.

3. The method of claim 2, wherein in said step of printing, the dots on said basic raster lines are printed with greater energy than the dots on said additional raster lines.

4. The method of claim 3, wherein the dots on said basic raster lines exceed the dots on said additional raster lines in width by an amount equal to a horizontal spacing between dots in said final image.

5. The method of claim 1, wherein the vertical resolution of said intermediate image is equal to said first vertical resolution.

6. The method of claim 1, wherein the vertical resolution of said intermediate image is equal to m times said first vertical resolution.

7. The method of claim 1, wherein said final image is printed with a vertical resolution equal to twice the vertical resolution of said intermediate image.

8. The method of claim 1, further comprising the steps of:
counting horizontal raster lines in said dot image; and
compressing said final image vertically by reducing a spacing between horizontal raster lines when said final image is printed, if said dot image has more than a certain number of lines, thereby enabling said final image to be printed on one page.

9. The method of claim 1, wherein said dot image is a facsimile image.

10. A printing apparatus capable of receiving a dot image having a first horizontal resolution and printing said dot image at a second horizontal resolution which is a half-integer multiple of the first horizontal resolution, said dot image also having a certain first vertical resolution, comprising:
a resolution multiplier for generating an intermediate image having a horizontal resolution equal to m times said first horizontal resolution, m being an odd integer greater than unity, and a vertical resolution not less than said first vertical resolution, by copying dots in said dot image;
a smoothing processor coupled to said resolution multiplier, for smoothing said intermediate image, dividing the horizontal resolution of said intermediate image by two, and doubling the vertical resolution of said intermediate image, thereby producing a final image with a horizontal resolution equal to said first horizontal resolution multiplied by m/2; and
a printing head coupled to said smoothing processor, for printing said final image at said first horizontal resolution multiplied by m/2.

11. The printing apparatus of claim 10, wherein:
said final image comprises basic raster lines and additional raster lines, said basic raster lines alternating with said additional raster lines;
said smoothing processor generates dots on said basic raster lines by logical AND operations on pairs of adjacent dots in said intermediate image; and
said smoothing processor generates dots on said additional raster lines by logical exclusive OR operations on pairs of adjacent dots in said intermediate image.

12. The printing apparatus of claim 11, further comprising a head data output processor for controlling printing energy supplied to said printing head, causing said printing head to print dots on said basic raster lines with greater energy than dots on said additional raster lines.

13. The printing apparatus of claim 12, wherein the dots on said basic raster lines exceed the dots on said additional raster lines in width by an amount equal to a horizontal spacing between dots in said final image.

14. The printing apparatus of claim 10, wherein said resolution multiplier makes the vertical resolution of said intermediate image equal to said first vertical resolution.

15. The printing apparatus of claim 10, wherein said resolution multiplier makes the vertical resolution of said intermediate image equal to m times said first vertical resolution.

16. The printing apparatus of claim 10, wherein said printing head prints said final image with a vertical resolution equal to twice the vertical resolution of said intermediate image.

17. The printing apparatus of claim 10, wherein said smoothing processor comprises a clock generator for generating a dot transfer clock signal, and said resolution multiplier comprises a frequency divider for dividing a frequency of said dot transfer clock signal by m.

18. The printing apparatus of claim 10, wherein said smoothing processor comprises a line timing generator for generating a master line timing signal, and said resolution multiplier comprises a frequency divider for dividing a frequency of said master line timing signal by m.

19. The printing apparatus of claim 10, wherein said smoothing processor comprises:
a plurality of line timing signal generators for generating line timing signals with different frequencies; and
a first selector for selecting a line timing signal generated by one of said line timing signal generators.

20. The printing apparatus of claim 19, wherein said smoothing processor comprises a frequency-division factor selector for designating a frequency division factor, and said resolution multiplier comprises a programmable frequency divider for dividing the line timing signal selected by the first selector by the frequency division factor designated by said frequency-division factor selector.

21. The printing apparatus of claim 10, wherein said smoothing processor comprises:
a line counter for counting raster lines in said dot image;
a page length memory storing a value representing a number of lines that can be printed on a page at a certain vertical resolution;
a programmable line timing signal generator for generating a line timing signal having a programmable frequency; and
a processing unit for programming said programmable line timing generator when the number of lines counted by said line counter exceeds the number of lines represented by the value stored in said page length memory, thereby compressing said final image vertically by reducing a spacing between horizontal raster lines when said final image is printed, and enabling said final image to be printed on one page.

22. The printing apparatus of claim 10, wherein said resolution multiplier comprises:
a line buffer for temporarily storing one raster line of a bit-mapped input image signal representing said dot image; and
a second selector for selecting said bit-mapped input image signal while said bit-mapped input image signal is also being stored in said line buffer, then reading said bit-mapped input image signal from said line buffer an even number of times, thereby generating an odd number of raster lines in said intermediate image.

23. The printing apparatus of claim 22, wherein said resolution multiplier also comprises a third selector for selecting one signal among said bit-mapped input image signal and a signal output by said first selector, the signal selected by said third selector being supplied to said smoothing processor.

24. The printing apparatus of claim 10, wherein said dot image is a facsimile image.

* * * * *